(12) United States Patent
Yoshida et al.

(10) Patent No.: US 9,886,027 B2
(45) Date of Patent: Feb. 6, 2018

(54) LENS MANUFACTURING SYSTEM, LENS MANUFACTURING METHOD, COMPUTER PROGRAM, LENS DESIGN DATA USE MANAGEMENT SYSTEM, LENS DESIGN DATA USE MANAGEMENT DEVICE, LENS PROCESSING MANAGEMENT DEVICE, LENS PROCESSING MANAGEMENT METHOD, LENS PROCESSING MANAGEMENT SYSTEM, LENS DESIGN DATA USE MANAGEMENT PROGRAM, AND LENS PROCESSING MANAGEMENT PROGRAM

(75) Inventors: Yoshinori Yoshida, Yokohama (JP); Yukio Honma, Yamato (JP); Hideya Inoue, Yokohama (JP); Koji Yamagaki, Yokosuka (JP)

(73) Assignees: NIKON-ESSILOR CO., LTD., Tokyo (JP); NIKON CORPORATION, Tokyo (JP)

( * ) Notice: Subject to any disclaimer, the term of this patent is extended or adjusted under 35 U.S.C. 154(b) by 1267 days.

(21) Appl. No.: 13/594,359

(22) Filed: Aug. 24, 2012

(65) Prior Publication Data
US 2013/0226326 A1 Aug. 29, 2013

Related U.S. Application Data

(63) Continuation of application No. PCT/JP2011/054473, filed on Feb. 28, 2011.

(30) Foreign Application Priority Data

Feb. 26, 2010 (JP) ................. 2010-042748

(51) Int. Cl.
*G05B 19/418* (2006.01)
*G05B 19/12* (2006.01)
*G06Q 30/06* (2012.01)

(52) U.S. Cl.
CPC ....... *G05B 19/4183* (2013.01); *G05B 19/128* (2013.01); *G06Q 30/0621* (2013.01); *Y02P 90/10* (2015.11); *Y02P 90/265* (2015.11)

(58) Field of Classification Search
USPC ........................................ 700/103
See application file for complete search history.

(56) References Cited

U.S. PATENT DOCUMENTS 5,454,194 A 10/1995 Gottschald
6,751,598 B1 6/2004 Yagawa et al.
(Continued)

FOREIGN PATENT DOCUMENTS

CN 1947372 4/2007
CN 101107612 1/2008
(Continued)

OTHER PUBLICATIONS

Office Action dated Jun. 19, 2014 issued in the corresponding Chinese Patent Application No. 20118001139.1.
(Continued)

*Primary Examiner* — Carlos Ortiz Rodriguez
(74) *Attorney, Agent, or Firm* — Cozen O'Connor

(57) ABSTRACT

A lens processing management system includes a lens processing section that processes a lens based on design data, an authentication section that is substantially attached to a lens material or a semi-finished lens product, and an authentication processing section that performs an authentication process for the processing of the lens using the authentication section.

35 Claims, 13 Drawing Sheets

(56) References Cited

U.S. PATENT DOCUMENTS

| | | | |
|---|---|---|---|
| 7,980,920 B2 * | 7/2011 | Akiyama | B24B 9/146 451/10 |
| 2003/0055788 A1 | 3/2003 | Sakuma et al. | |
| 2005/0073648 A1 * | 4/2005 | Toshima | A61B 3/10 351/200 |
| 2005/0122472 A1 | 6/2005 | Fisher et al. | |
| 2005/0157254 A1 | 7/2005 | Shinohara et al. | |
| 2007/0274626 A1 | 11/2007 | Sabeta | |
| 2012/0022985 A1 | 1/2012 | Yoshida et al. | |

FOREIGN PATENT DOCUMENTS

| | | |
|---|---|---|
| DE | 4127094 | 2/1993 |
| EP | 0447084 | 9/1991 |
| EP | 1 555 588 | 7/2005 |
| EP | 2 341 481 | 8/2009 |
| JP | 06-224096 | 8/1994 |
| JP | 10-175149 | 6/1998 |
| JP | 2000-284234 | 10/2000 |
| JP | 2002-113725 | 4/2002 |
| JP | 2002-174800 | 6/2002 |
| JP | 2002-297543 | 10/2002 |
| JP | 2003-099143 | 4/2003 |
| JP | 2003-270592 | 9/2003 |
| JP | 2003-271703 | 9/2003 |
| JP | 2003-295134 | 10/2003 |
| JP | 2005-513526 | 5/2005 |
| JP | 2005-202291 | 7/2005 |
| JP | 2006-107524 | 4/2006 |
| JP | 10-021144 | 1/2010 |
| KR | 20080094165 | 10/2008 |
| WO | WO 2009/034772 | 3/2009 |
| WO | WO 2010/023941 | 3/2010 |

OTHER PUBLICATIONS

Search Report and Written Opinion dated May 24, 2011 issued in International Patent Application No. PCT/JP2011/054473.

Office Action (and an English Translation thereof) dated Nov. 5, 2013 issued in the corresponding Japanese Patent Application No. 2010-042748.

Office Action (and an English translation thereof) dated Apr. 1, 2014 issued in the corresponding Japanese Patent Application No. 2010-042748.

Office Action dated Jan. 26, 2016 which issued in the corresponding Japanese Patent Application No. 2015-078407.

Office Action dated Sep. 15, 2015 which issued in the corresponding Chinese Patent Application No. 201180011391.1.

Search Report dated Apr. 11, 2017 which issued in the corresponding European Patent Application No. 11747553.3.

Office Action dated Dec. 5, 2017 which issued in the corresponding Japanese Patent Application No. 2017-014059.

* cited by examiner

FIG. 5

| LENS DESIGN DATA IDENTIFICATION INFORMATION | ACCUMULATED NUMBER OF PROCESSING | MAXIMUM NUMBER OF PROCESSING | FIRST-TIME PERMISSION RESPONSE DATE |
|---|---|---|---|
| abc12345 | 2 | 4 | 20080620 |
| bca23456 | 10 | 20 | 20080601 |
| cab24567 | 20 | 20 | 20080620 |
| ... | ... | | ... |

US 9,886,027 B2

LENS MANUFACTURING SYSTEM, LENS MANUFACTURING METHOD, COMPUTER PROGRAM, LENS DESIGN DATA USE MANAGEMENT SYSTEM, LENS DESIGN DATA USE MANAGEMENT DEVICE, LENS PROCESSING MANAGEMENT DEVICE, LENS PROCESSING MANAGEMENT METHOD, LENS PROCESSING MANAGEMENT SYSTEM, LENS DESIGN DATA USE MANAGEMENT PROGRAM, AND LENS PROCESSING MANAGEMENT PROGRAM

CROSS-REFERENCE TO RELATED APPLICATION

This is a Continuation Application of International Application No. PCT/JP2011/054473, filed Feb. 28, 2011, which claims priority to Japanese Patent Application No. 2010-042748, filed Feb. 26, 2010. The contents of the aforementioned applications are incorporated herein by reference.

BACKGROUND

Field of the Invention

The present invention relates to a lens manufacturing system, a lens manufacturing method, a computer program, a lens design data use management system, a lens design data use management device, a lens processing management device, a lens processing management method, a lens processing management system, a lens design data use management program, and a lens processing management program.

Description of Related Art

In recent years, a system in which an enterprise having the optical design know-how provides a design service for an enterprise without the optical design know-how has been proposed (see Japanese Unexamined Patent Application, First Publication No. 2005-202291). In the technology disclosed in Japanese Unexamined Patent Application, First Publication No. 2005-202291, a terminal device of a lens manufacturer (the enterprise without the optical design know-how) is connected to a terminal device of a design data producer (the enterprise having the optical design know-how) through a network, and the design data producer transmits the design data through the network when the lens manufacturer accepts a contract for supply of the design data.

In the service using such a system, it is general that the enterprise that performs the optical design charges a fee incurred according to the number of lenses manufactured based on the design by the enterprises receiving the design of the lenses. For example, the system disclosed in Japanese Unexamined Patent Application, First Publication No. 2005-202291 is provided with a transmission counting section that counts the number of transmissions of design data of a lens, and a fee is calculated based on the number of transmissions counted by the transmission counting section.

In Japanese Unexamined Patent Application, First Publication No. 2002-174800, a lens shape processing data communication system for glasses that connects a communication device of a store that sells glasses to a communication device of a lens processing enterprise that processes lenses of glasses through a network is disclosed. The lens shape processing data communication system for glasses is a technology in which lens shape processing data such as kinds of lenses is transmitted from the communication device of the store, and the data is displayed and output to the communication device of the lens processing enterprise receiving the data.

SUMMARY

An object of an aspect according to the invention is to provide a technology capable of appropriately managing lens processing using data.

According to an aspect of the invention, a lens processing management system is provided, including: a lens processing section that processes a lens based on design data; an authentication section that is substantially attached to a lens material or a semi-finished lens product; and an authentication processing section that performs an authentication process for the processing of the lens using the authentication section.

According to an aspect of the invention, a lens processing management system is provided, including: a processing device that processes a lens; a data supply device that supplies design data to the processing device; and a restriction unit that restricts processing of the lens using the design data in the processing device, wherein the restriction unit includes an authentication unit including information used in authentication of use permission of the design data, the authentication unit being supplied to the processing device with a semi-finished product of the lens or being embedded in the semi-finished product of the lens.

According to an aspect of the invention, a lens manufacturing system is provided, including: a processing section that processes a lens using design data supplied from a data supply device; and a restriction unit that restricts the processing of the lens using the design data in the processing section, wherein the restriction unit includes an authentication unit including information used in authentication of use permission of the design data, the authentication unit being supplied to the processing device with a semi-finished product of the lens or being embedded in the semi-finished product of the lens.

According to an aspect of the invention, a lens manufacturing method is provided, including: permitting use of design data based on authentication using an authentication unit supplied to a processing device with a semi-finished product of a lens or embedded in the semi-finished product of the lens; and processing the lens using the design data.

According to an aspect of the invention, a computer program is provided for executing: a step of permitting use of design data based on authentication using an authentication unit supplied to a processing device with a semi-finished product of a lens or embedded in the semi-finished product of the lens; and a step of processing the lens using the design data.

According to an aspect of the invention, a lens processing management method is provided, including: permitting use of design data based on authentication using an authentication unit supplied to a processing device with a semi-finished product of a lens or embedded in the semi-finished product of the lens; and performing lens processing in the processing device using the design data.

According to an aspect of the invention, a data supply device is provided which supplies design data to a processing device processing a lens, including: a restriction unit that restricts processing of the lens using the design data in the processing device, wherein the restriction unit includes an authentication unit including information used in authentication of use permission of the design data, the authentication unit being supplied to the processing device with a semi-finished product of the lens or being embedded in the semi-finished product of the lens.

According to an aspect of the invention, a lens design data use management system is provided, including: a lens processing management device that manages processing of a lens using lens design data; and a lens design data use management device that communicates with the lens processing management device, wherein the lens processing management device includes an authentication requirement transmitting section that transmits an authentication requirement based on information of an authentication section substantially attached to a lens material or a semi-finished lens product to the lens design data use management device before the processing of the lens is performed using the lens design data, and a design data control section that enables the lens design data to be used when an authentication permission response representing permission of the processing of the lens is received as a response to the authentication requirement transmitted by the authentication requirement transmitting section, and wherein the lens design data use management device includes an authentication processing section that determines whether or not to permit the processing of the lens based on information about a use state of the lens design data with respect to the authentication requirement transmitted from the authentication requirement transmitting section, and an authentication responding section that transmits the authentication permission response to the lens processing management device when the authentication processing section permits the processing of the lens.

According to an aspect of the invention, a lens processing management device is provided which communicates with a lens design data use management device and manages processing of a lens using lens design data, including: an authentication requirement transmitting section that transmits an authentication requirement based on information of an authentication section substantially attached to a lens material or a semi-finished lens product to the lens design data use management device before the processing of the lens is performed using the lens design data; and a design data control section that enables the lens design data to be used when an authentication permission response representing permission of the processing of the lens is received as a response to the authentication requirement transmitted by the authentication requirement transmitting section.

According to an aspect of the invention, a lens design data use management device is provided which communicates with a lens processing management device, including: an authentication processing section that determines whether or not to permit processing of a lens with respect to an authentication requirement based on information of an authentication section substantially attached to a lens material or a semi-finished lens product; and a processing or non-processing responding section that transmits an authentication response representing permission of the processing of the lens to the lens processing management device when the authentication processing section determines that the processing of the lens is permitted.

According to an aspect of the invention, a lens processing management program is provided for causing a computer of a lens processing management device which communicates with a lens design data use management device and manages processing of a lens using lens design data, to function as: an authentication requirement transmitting unit that transmits an authentication requirement based on information of an authentication section substantially attached to a lens material or a semi-finished lens product to the lens design data use management device before the processing of the lens is performed using the lens design data; and a design data control unit that enables the lens design data to be used when an authentication permission response representing permission of the processing of the lens is received as a response to the authentication requirement transmitted by the authentication requirement transmitting section.

According to an aspect of the invention, a lens design data use management program is provided for causing a computer of a lens design data use management device which communicates with a lens processing management device, to function as: an authentication processing unit that determines whether or not to permit processing of a lens based on information about a use state of the lens design data with respect to an authentication requirement for confirming whether processing or non-processing of the lens transmitted from the lens processing management device is performed; and an authentication responding unit that transmits an authentication permission response representing permission of the processing of the lens to the lens processing management device when the authentication processing section permits the processing of the lens.

According to the aspects of the invention, it is possible to appropriately manage the lens processing using the data.

BRIEF DESCRIPTION OF DRAWINGS

FIG. 5 is a schematic diagram illustrating an example of lens design data using an information management table.

DESCRIPTION OF EMBODIMENTS

Hereinafter, embodiments will be described with reference to the drawings.

Figure 1:
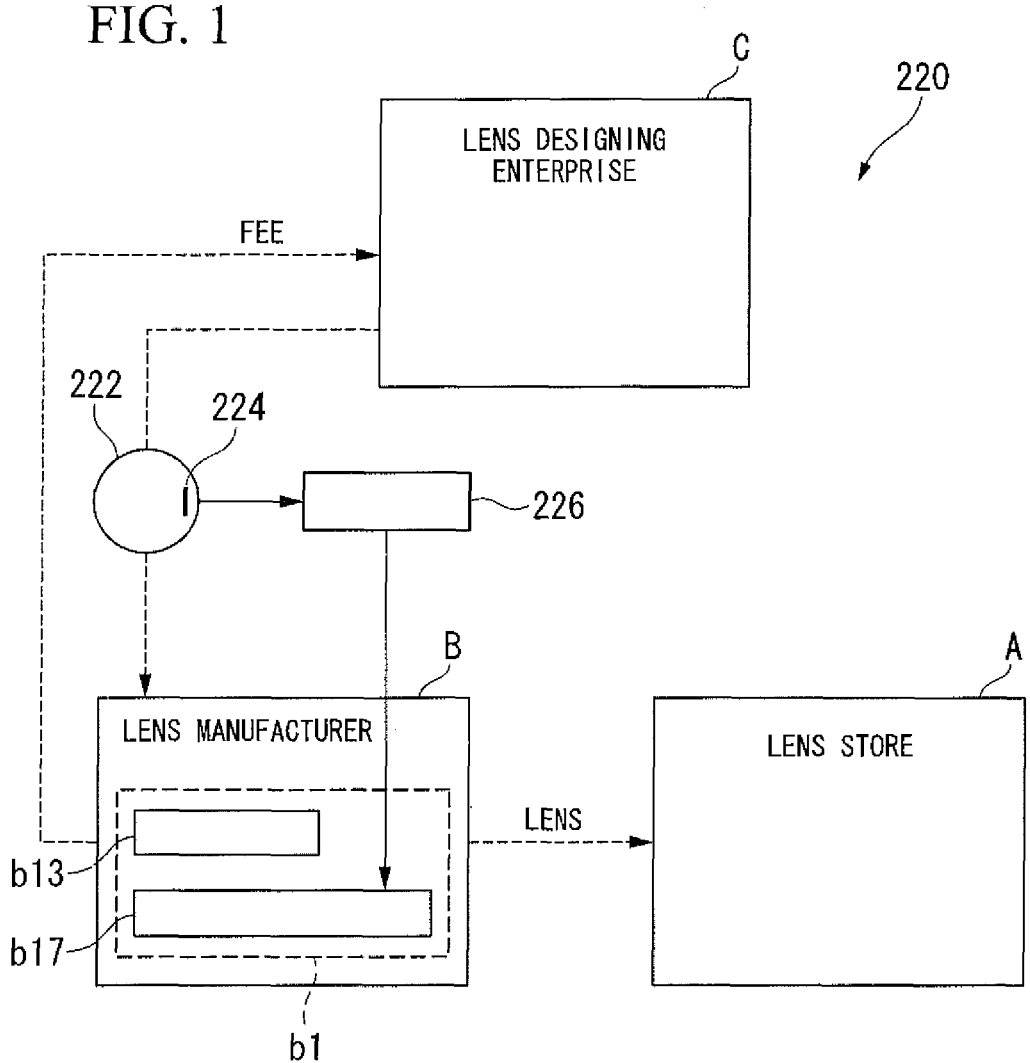
FIG. 1 is a concept diagram illustrating a lens processing management system according to an embodiment.

FIG. 1 is a concept diagram illustrating a lens processing management system (a lens design data use management system) 220 according to an embodiment.

In the embodiment, as shown in FIG. 1, a lens processing management system (a lens manufacturing system, and a lens design data use management system) 220 includes a lens processing device b1 including a lens processing section b17 that processes a lens based on design data, an authentication section (a restriction unit, and an authentication unit) 224 substantially attached to a lens material or a semi-finished lens product 222, and an authentication processing section 226 that performs an authentication process for processing of the lens using the authentication section 224.

In the embodiment, the semi-finished lens product 222 is provided from a lens designing enterprise C to a lens manufacturer B. In the embodiment, the authentication section 224 includes information (for example, authentication codes, and authentication parameters) used in authentication of use permission of design data, and is embedded in the semi-finished lens product 222. As an example, the authentication section 224 includes one authentication code corresponding to one semi-finished lens product 222. As another example, the authentication section 224 includes one or a plurality of authentication codes corresponding to a plurality of semi-finished lens products 222.

As an aspect of the authentication section 224, various authentication marks such as special marking and IC tag may be applied. The authentication section 224 embedded in the semi-finished lens product 222 is easily visible and/or detectable, or is not easily visible, and is detectable only through a predetermined device.

Alternatively or additionally, the authentication section 224 is attached to the semi-finished lens product 222, and is integrally shipped and transported. For example, the authentication section 224 may be provided in an object different from the semi-finished lens product 222. The authentication section 224 provided in the different object is easily visible and/or detectable, or is not easily visible, and is detectable only through a predetermined device.

An authentication section 22 may be minimally configured so as not to be easily visible, or may be configured to be substantially transparent. The lens manufacturer B pays the lens designing enterprise C at least for the semi-finished lens product 222 including payment for the authentication information of the authentication section 224.

In the embodiment, the design data is stored in a lens design data storing section b13, and the use thereof is restricted based on authentication. That is, as long as the use permission is not authenticated, the processing device b1 cannot use the design data. The authentication information (the authentication code, and the authentication parameter) of the authentication section 224 is input through an input unit (not shown), or is detected through a detection unit (not shown), and is analyzed by an analysis unit (not shown) as necessary.

The authentication processing section 226 performs an authentication process on the authentication information. The authentication process may include at least one of approval of provided information, confirmation of correspondence between provided information and registered information, verification of qualification or disqualification, configuration of identification information according to individual enterprises or individual devices, and confirmation of warranty or accuracy of procedure course. For example, in the authentication section 226, the design data can be read as long as a correct authentication code is not input. In the embodiment, when the authentication information is authenticated, the use restriction of the design data is released. In an example, the authentication processing section 226 may be configured as an example of the computer program. In another example, the authentication processing section 226 may include the detection unit, an analysis unit, and a computer program as necessary.

In an example, the authentication process may be performed in the lens processing device b1 using an authentication program provided together with or provided separately from design data. In this case, the authentication program is simple. In another example, the authentication process may be performed by the lens designing enterprise through the Internet. In this case, it is possible to avoid wrongful modification of the authentication processing process.

The authentication process may be performed based on one parameter or based on combination of two or more parameters. In an example of the authentication process using the plurality of parameters, the authentication program requires authentication information of the authentication section 224 and the identification information of the design data. In another example, the authentication program requires the authentication information of the authentication section 224, and the ID information of the lens processing device b1 (or the lens manufacturer). The identification information of the design data or the ID information of the lens processing device b1 (or the lens manufacturer) may be stored in the lens processing device b1 or may be stored in another object or medium. Additionally or alternatively, the authentication process may use an authentication support physical device (a security token).

In the embodiment, in the lens processing of the processing device b1, an authentication procedure using the authentication section 224 is required, and thus the processing of the lens wrongfully using the design data is restricted. The processing of the lens using a material or a semi-finished product different from the semi-finished lens product provided from lens designing enterprise C is restricted.

Figure 2:
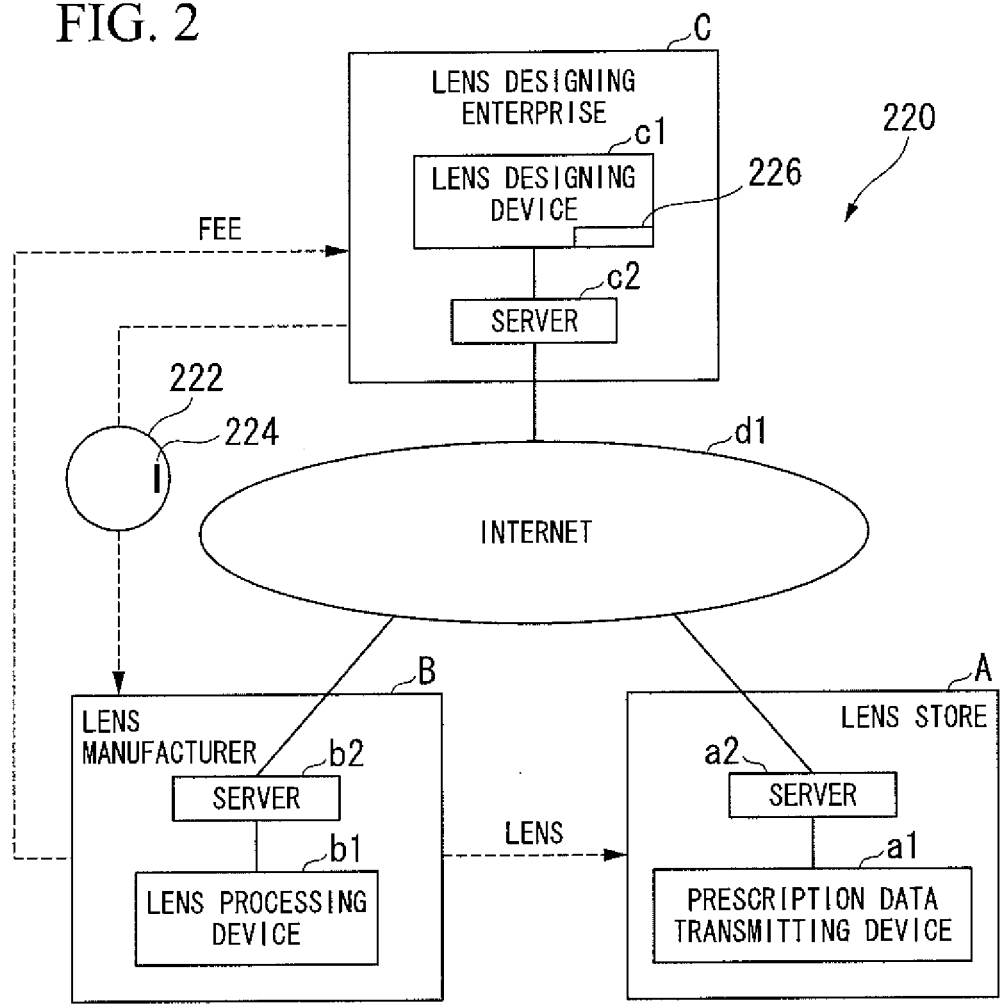
FIG. 2 is a concept diagram illustrating a lens processing management system according to another embodiment.

FIG. 2 is a concept diagram illustrating an example of another embodiment to which the lens processing management system (the lens manufacturing system, and the lens design data use management system) 220 shown in FIG. 1 is applicable. In FIG. 2, the lens designing enterprise C, the lens manufacturer B, and the lens store A are connected through the Internet d1.

In FIG. 2, a server a2 managed by the lens store A such as a glasses store, a server b2 managed by the lens manufacturer B that processes a lens and delivers the lens to the store, and a server c2 managed by the lens designing enterprises C that designs the lens are connected to the internet d1. The lens processing device b1 connected to the server b2 can communicate a prescription data transmitting device a1 connected to the server a2, and a lens designing device (a data supply device) c1 connected to the server c2.

In the embodiment, the lens processing device b1 receives order data for placing an order of lenses and prescription data including information about lens prescription of a customer using a lens and a frame shape of glasses, from the prescription data transmitting device a1, and transmits the received prescription data to the lens designing device c1. The lens processing device b1 receives and stores the design data (hereinafter, referred to as lens design data) of the lens about the transmitted prescription data from the lens designing device c1.

As described above, the lens manufacturer B requests the lens designing enterprise C to design a lens, and pays a design fee for the provided lens. The design fee paid to the lens designing enterprise C by the lens manufacturer B is a design fee for processing per lens. For example, the lens manufacturer B has to pay the lens designing enterprise C for a design fee corresponding to the processing of each lens even in the processing of the lens using the same lens design data.

In the embodiment, the lens processing device b1 transmits the authentication code of the authentication section 224 attached to the semi-finished lens product 222 to the lens designing device c1 before performing the processing of the lens. In the lens designing device c1, the authentication processing section 226 performs the authentication process on the received authentication code, and transmits the authentication response that is the authentication result to the lens processing device b1.

When the authentication response received from the lens designing device c1 is the authentication permission response, the lens processing device b1 can process the lens. The lens manufacturer B delivers the processed lens to the lens store A.

As described above, the lens design data use management system 220 determines the authentication code received from the lens processing device b1 by the lens designing device c1, and thus it is possible to appropriately manage the use state of the lens design data.

<Lens Processing Device>

Hereinafter, the lens processing device b1 and the lens designing device c1 shown in FIG. 2 will be described in detail.

Figure 3:
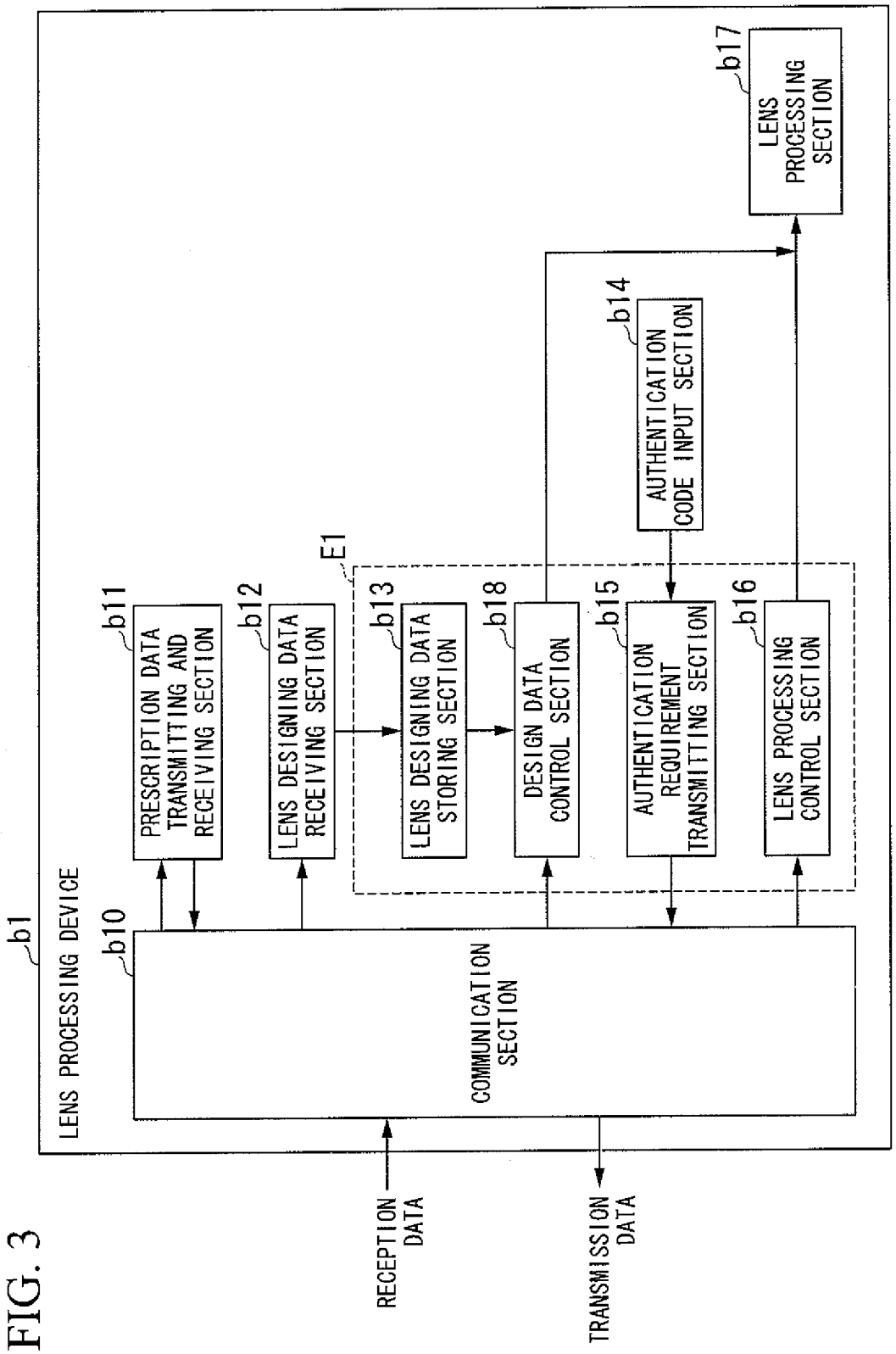
FIG. 3 is a block diagram schematically illustrating a configuration of a lens processing device.

FIG. 3 is a schematic block diagram illustrating a configuration of the lens processing device b1 according to the embodiment.

The lens processing device b1 includes a communication section b10, a prescription data transmitting and receiving section b11, a lens design data receiving section b12, a lens design data storing section b13, an authentication code input section b14, an authentication requirement transmitting section b15, a lens processing control section b16, a lens processing section b17, and a design data processing section b18.

The lens processing management device E1 includes a lens design data storing section b13, a design data processing section b18, an authentication requirement transmitting section b15, and a lens processing control section b16. In FIG. 3, only a schematic configuration according to the description of the embodiment is shown.

The communication section b10 receives data from the prescription data transmitting device a1, and the lens designing device c1 through the server b2 shown in FIG. 2. The communication section b10 transmits data to the lens designing device c1 through the server b2 shown in FIG. 2.

The prescription data transmitting and receiving section b11 receives prescription data from the prescription data transmitting device a1 through the communication section b10. The prescription data transmitting and receiving section b11 transmits the received prescription data to the lens designing device c1 through the communication section b10.

The lens designing data receiving section b12 receives lens design data from the lens designing device c1 through the communication section b10. The lens design data receiving section b12 stores the received lens design data in the lens design data storing section b13. The lens design data includes identification information for identifying the lens design data.

The lens design data includes, for example, as surface-shaped data, at least one of information about an aspheric surface, a surface formed by synthesizing an astigmatic surface and an aspheric surface, a progressive focus surface, a surface formed by synthesizing a progressive focus surface and an astigmatic surface, a surface formed by a progressive focus surface, an astigmatic surface, and an aspheric surface, and a free-form surface causing a lens operation as a glasses lens when light passes through a front face and a back face of the lens. The lens design data includes, for example, at least one of information about a blank material shape, a refractive index of a blank material, a thickness of a lens, an outer diameter of a lens, and an outer circumferential shape. The lens design data includes, for example, at least one of information about an S frequency of a lens, a C frequency, an axis degree, a prism, and eccentricity.

In the authentication code input section b14, the identification code of the authentication section 224 of the semi-finished lens product 222 is input by an operation of a user, or is detected through a predetermined detection section. The authentication code input section b14 outputs the authentication code to the authentication requirement transmitting section b15.

The authentication requirement transmitting section b15 transmits a requirement that is a confirmation requirement including the authentication code and the identification information of the lens design data and is an authentication requirement for requiring determination of the authentication code to the lens designing device c1 through the communication section b10.

That is, the authentication requirement transmitting section b15 transmits the authentication requirement for authenticating the processing of the lens to the lens design data use management device E2 to be described later before performing the processing of the lens using the lens design data. The processing of the lenses is performed one by one, and the authentication requirement transmitting section b15 transmits the authentication requirement for each lens.

The design data control section b18 receives an authentication response that is a response of the authentication requirement, and determines whether or not the authentication is permitted. When the authentication response is the authentication permission response (the use permission response), the design data control section b18 reads the lens design data from the lens design data storing section b13.

In this case, the design data control section b18 outputs the read lens design data to the lens processing section b17. The lens processing control section b16 outputs control information for starting the processing of the lens to the lens processing section b17. That is, when the use permission is received, the design data control section b18 makes the design data into a state where the design data is actually usable.

Meanwhile, when the determination result is a response (hereinafter, referred to as an authentication non-permission response) representing authentication non-permission, an error message representing that the processing of the lens cannot be performed is output to a monitor (not shown).

The lens processing section b17 processes the lens using the lens design data input from the design data control section b18, according to the control information input from the lens processing control section b16.

<Lens Designing Device>

Figure 4:
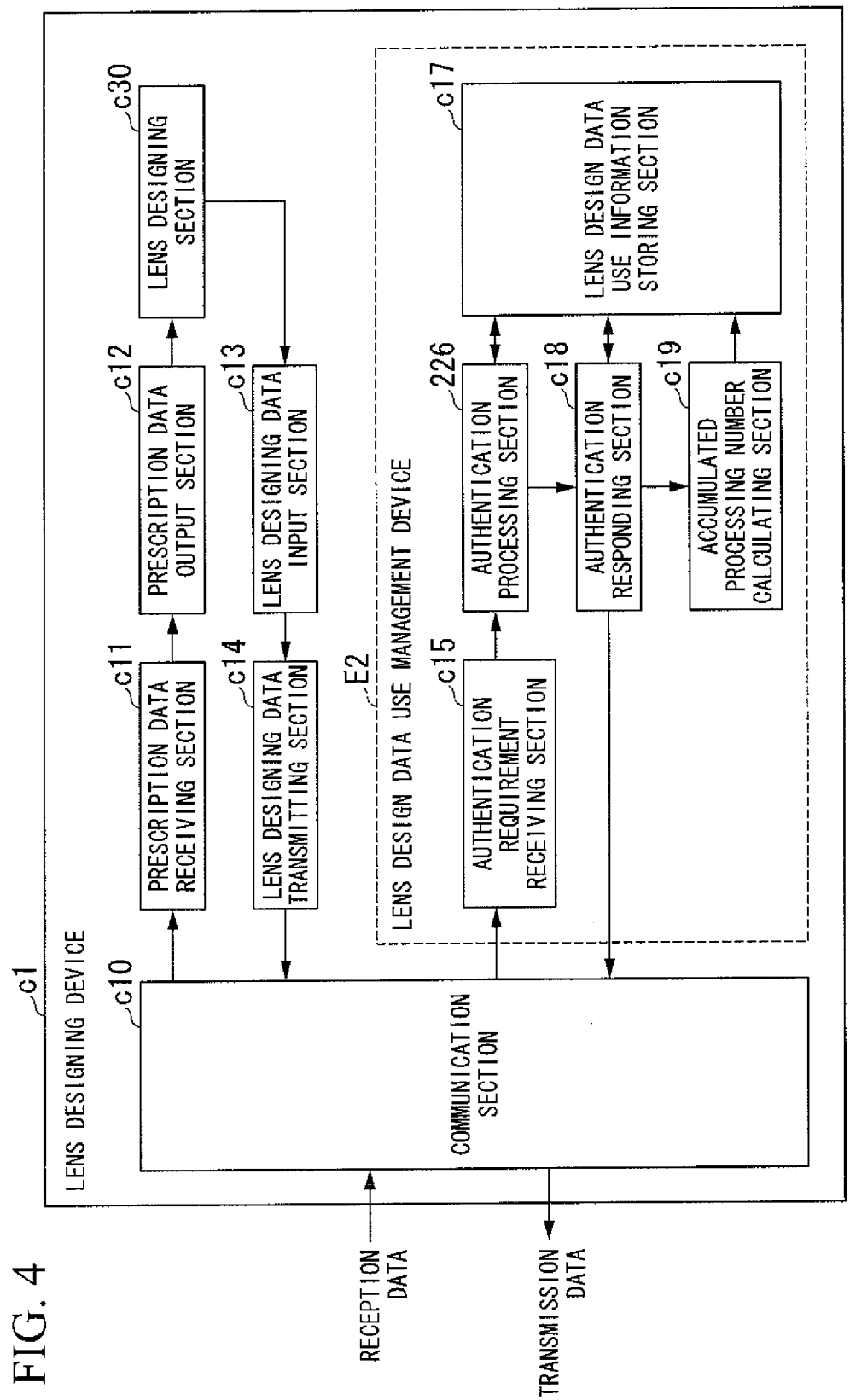
FIG. 4 is a block diagram schematically illustrating a configuration of a lens designing device.

FIG. 4 is a schematic block diagram illustrating a configuration of the lens designing device c1 according to the embodiment.

The lens designing device c1 includes a communication section c10, a prescription data receiving section c11, a prescription data output section c12, a lens designing data input section c13, a lens design data transmitting section c14, a lens designing section c30, an authentication requirement receiving section c15, an authentication processing section 226, a lens design data using information storing section c17 (a first-time permission response date and time storing section), an authentication responding section c18, and an accumulated processing number calculating section c19.

The lens design data use management device E2 includes an authentication requirement receiving section c15, an authentication processing section 226, a lens design data using information storing section c17, an authentication responding section c18, and an accumulated processing number calculating section c19. In FIG. 4, only a schematic configuration according to the description of the embodiment is shown.

The communication section c10 receives data from the lens processing device b1 through the server c2 shown in FIG. 2 and transmits the data. The prescription data receiving section c11 receives the prescription data from the lens processing device b1 through the communication section c10, and outputs the prescription data to the prescription data output section c12. The prescription data output section c12 outputs the prescription data input from the prescription data receiving section c11, to an output device such as a monitor or a printer. The prescription data from the prescription data output section c12 is transmitted to the lens designing section c30. The lens designing section c30 designs a lens using the input prescription data, and outputs the design information of the lens to the lens design data input section c13.

The design information of the lens designed for the prescription data output by the prescription data output section c12 is input to the lens design data input section c13. The lens design data input section c13 generates lens design data causing the input design data of the lens to include the identification information, and outputs the generated lens design data to the lens design data transmitting section c14. The lens design data transmitting section c14 transmits the lens design data input from the lens design data input section c13 to the lens processing device b1 through the communication section c10.

The authentication requirement receiving section c15 receives the authentication requirement from the lens processing device b1 through the communication section c10, and outputs the authentication code included in authentication requirement, the identification information of the lens design data, and the reception date of the authentication requirement, to the authentication processing section 226.

The authentication processing section 226 performs the authentication of the authentication code. The authentication processing section 226 reads the accumulated processing number corresponding to the identification information of the lens design data input from the authentication requirement receiving section c15, from a lens design data using information management table (FIG. 5) of the lens design data using information storing section c17.

The authentication processing section 226 determines whether or not to permit the process of the lens using the lens design data of the identification information included in the authentication requirement, from the read accumulated processing number and the authentication requirement receiving section c15.

The accumulated processing number stored in the lens design data using information storing section c17 is the accumulated processing number calculated by the accumulated processing number calculating section c19 to be described later. The first-time permission response date stored in the lens design data using information storing section c17 is the first response date of the authentication permission response stored by the authentication responding section c18 to be described later.

Hereinafter, determination based on the maximum processing number of the lens using the lens design data and determination based on the processing permission period of the lens will be described.

<Determination based on Maximum Processing Number of Lens>

First, the authentication processing section 226 determines whether or not the read accumulated processing number falls within the maximum processing number stored in advance in the lens design data using information storing section c17. When the accumulated processing number is greater than the maximum processing number, the authentication section 226 performs determination so as not to permit the processing of the lens using the lens design data.

Meanwhile, when it is determined that the accumulated processing number falls within the maximum processing number, the authentication section 226 performs determination of the processing permission period of the following lens.

<Determination of Processing Permission Period of Lens>

The authentication processing section 226 determines whether or not the reception date of the authentication requirement input from the authentication requirement receiving section c15 falls within a processing permission period (20 days in the embodiment) that is a predetermined period, from the first-time permission response date that is the first response date of the authentication permission response stored in the lens design data using information storing section c17.

When the reception date of the authentication requirement about the lens design data of the target does not fall within the processing permission period from the first-time permission response date, the authentication processing section 226 determines that the processing of the lens using the lens design data is not permitted. Meanwhile, when the reception date of the authentication requirement about the lens design data of the target falls within the processing permission period from the first-time permission response date, the authentication processing section 226 determines that the processing of the lens using the lens design data is permitted.

The authentication processing section 226 outputs the determined information as to whether or not to permit the processing of the lens using the lens design data and the identification information of the lens design data to the authentication responding section c18.

That is, when the accumulated processing number calculated by an accumulated processing number calculating section c19 to be described later is not over the maximum processing number stored in advance, the authentication processing section 226 permits the processing of the lens using the lens design data. When the reception date of the authentication requirement falls within the period stored in advance from the first response date of the authentication permission response stored in the lens design data using information storing section c17, the authentication processing section 226 permits the processing of the lens using the lens design data.

When the information input from the authentication processing section 226 is the information representing that the processing of the lens is permitted, the authentication responding section c18 considers the authentication response as the authentication permission response. Meanwhile, when the information input from the authentication processing section 226 is the information representing that the processing of the lens is not permitted, the authentication responding section c18 considers the authentication response as the authentication non-permission response.

The authentication responding section c18 transmits the authentication response including the identification information of the lens design data input from the authentication processing section 226 to the lens processing device b1 through the communication section c10. The authentication responding section c18 outputs the information of the transmitted authentication response to the accumulated processing number calculating section c19.

The authentication responding section c18 stores the time transmitted for the first time as the first permission response date in the lens design data using information management table of the lens design data using information storing section c17, for each piece of identification information of the lens design data included in the information of the authentication response information. That is, the authentication responding section c18 stores the first response date and time of the authentication permission response in the lens design data using information storing section c17, for each lens design data.

When the authentication response is the authentication permission response, the accumulated processing number calculating section c19 reads the accumulated processing number which is stored in the lens design data using information storing section c17 and which corresponds to the identification information included in the information of the authentication response (the authentication permission response) input from the authentication response section c18. The accumulated processing number calculating section c19 stores the accumulated processing number obtained by adding the number of lenses (one in the embodiment) for which the processing of the lens represented by the information of the authentication permission response is permitted, to the accumulated processing number, as the accumulated processing number corresponding to the identification information, in the lens design data using information management table of the lens design data using information storing section c17. That is, the accumulated processing number calculating section c19 calculates the accumulated processing number of the number of processings permitted by the authentication permission response.

<Lens Design Data Using Information Management Table>

Hereinafter, the lens design data using information management table will be described in detail.

The lens design data using information management table is managed by a database.

FIG. 5 is a schematic diagram illustrating an example of the lens design data using information management table according to the embodiment. As shown, the lens design data using information management table is 2-dimensional table type data formed of rows and columns, and has columns of items of the lens design data identification information, the accumulated processing number, the maximum processing number, and the authentication response transmission date. A main key of the lens design data using information management table is the lens design data identification information.

For example, in FIG. 5, the data in which the lens design data identification information is "abc12345" represents that lenses of the accumulated processing number "2" are processed using the lens design data in which the lens processing device b1 is "abc12345", and represents permitting that the lenses are processed using the lens design data, up to the accumulated maximum processing number "4". In FIG. 5, the data in which the lens design data identification information is "abc12345" represents that the date when the processing of the lens is permitted for the first time using the lens design data in which the lens processing device b1 is "abc12345" is the first-time permission response date "Jun. 20, 2008".

In FIG. 5, the data in which the lens design data identification information is "bca23456" represents that the first-time permission response date is not within the processing permission period (20 days) from "Jun. 1, 2008", in a case of the date when the lens designing device c1 receives the authentication requirement is "Jul. 1, 2008". In this case, the lens designing device c1 transmits the authentication non-permission response.

In FIG. 5, the data in which the lens design data identification information is "cab24567" represents that the accumulated processing time and the maximum processing number are the same "20". In this case, the lens designing device c1 does not permit the processing of the lens using the lens design data of "cab24567" any more, and transmits the authentication non-permission response.

<Operation of Lens Design Data Use management System>

Hereinafter, an operation of the lens design data use management system 220 will be described.

Figure 6:
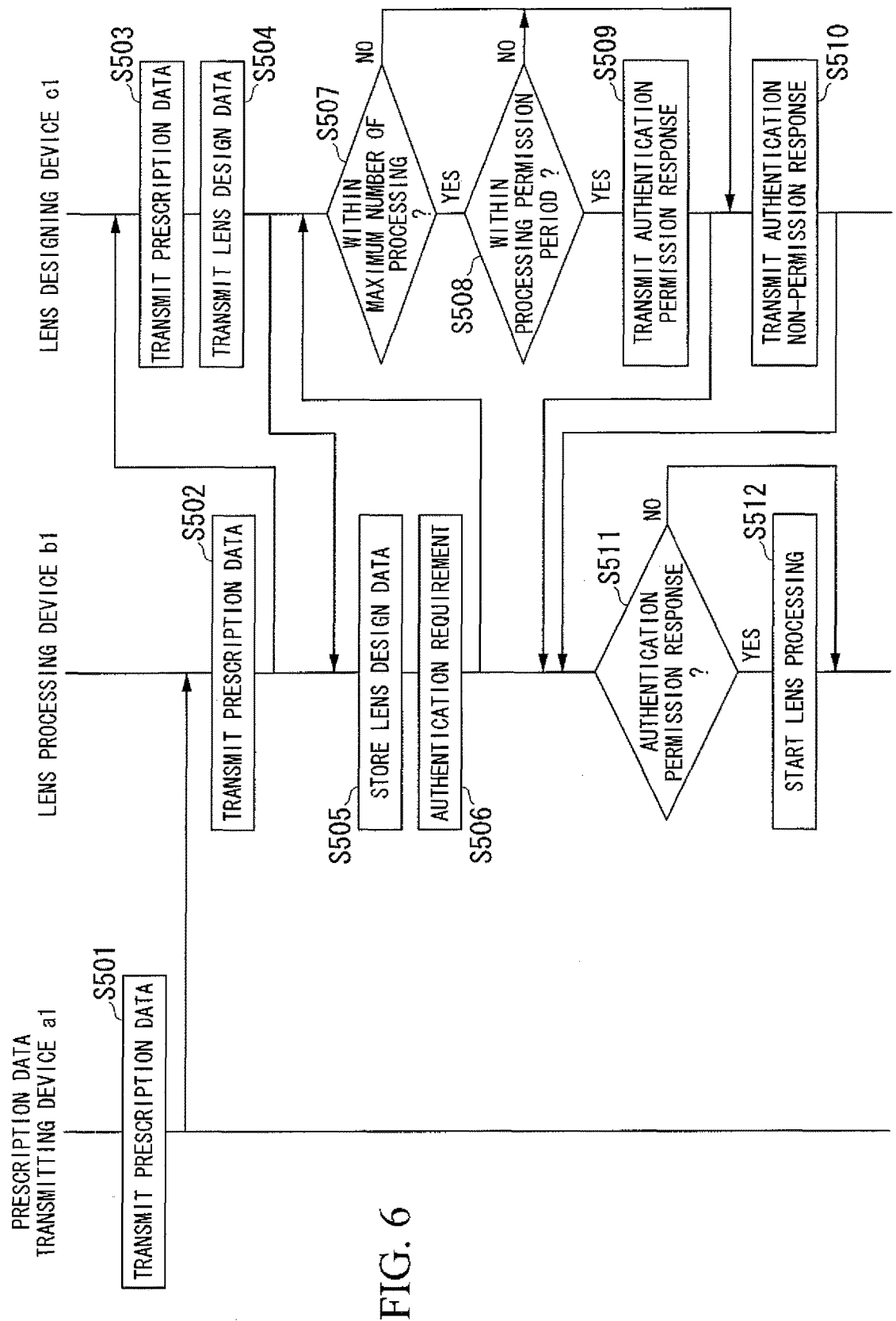
FIG. 6 is a flowchart illustrating an operation of a lens design data use management system.

FIG. 6 is a flowchart illustrating an operation of the lens design data use management system 220 according to the embodiment.

The prescription data transmitting device a1 transmits the order data for placing an order of the lens and the prescription data to the lens processing device b1 (S501).

The lens processing device b1 receives the prescription data transmitted by the prescription data transmitting device a1 in Step S501, and transmits the received prescription data to the lens designing device c1 (S502).

The lens designing device c1 receives the prescription data transmitted by the lens processing device b1 in Step S502, and outputs the received prescription data to the monitor or the printer (S503).

When the lens design date designed based on the prescription data output in Step S503 is input, the lens designing device c1 transmits the lens design data to the lens processing device b1 (S504).

The lens processing device b1 receives and stores the lens design data transmitted by the lens designing device c1 in Step S504 (S505).

When a command of starting the processing of the lens using the lens design data stored in Step S505 is input, the lens processing device b1 transmits the authentication requirement to the lens designing device c1 (S506)

The lens designing device c1 receives the authentication requirement transmitted by the lens processing device b1 in Step S506, and performs the following determination.

The lens designing device c1 determines whether or not the accumulated processing number falls with in the maximum processing number (S507). In the determination of Step S507, when it is determined that the accumulated processing number falls within the maximum processing number (Yes), the lens designing device c1 performs the determination of Step S508. Meanwhile, in the determination of Step S507, when the accumulated processing number is greater than the maximum processing number (No), the lens designing device c1 performs the process of Step S510.

The lens designing device c1 determines whether or not the reception date of the authentication requirement falls within the processing permission period from the first-time permission response date (S508). In the determination of Step S508, when it is determined that the reception date of the authentication requirement falls within the processing permission period from the first-time permission response date (Yes), the lens designing device c1 performs the process of Step S509. Meanwhile, in the determination of Step S508, when it is determined that the reception date of the authentication requirement does not fall within the processing permission period from the first-time permission response date (No), the lens designing device c1 performs the process of Step S510.

The lens designing device c1 transmits the authentication permission response as the authentication response to the lens processing device b1 (S509). The lens designing device c1 transmits the authentication non-permission response as the authentication response to the lens processing device b1 (S510).

The lens processing device b1 determines whether or not the authentication response received from the lens designing device c1 is the authentication permission response (Step S511). In the determination of Step S511, when the authentication response is the authentication permission response (Yes), the lens designing device c1 starts the processing of the lens using the lens design data of the identification information included in the authentication response (S512). Meanwhile, in the determination of Step S511, when the authentication response is the authentication non-permission response (No), the lens designing device c1 ends the present operation.

In the present operation, the lens designing device c1 determines the content of the authentication response based on the accumulated processing number and the processing permission period (S507 and S508), but the invention is not limited thereto, and may perform the determination based on any one of the accumulated processing number and the processing permission period.

As described above, in the embodiment, in the lens processing, the authentication process is performed using the authentication section 224, and the processing of the lens wrongfully using the design data and the processing of the lens using the material or semi-finished product different from the semi-finished lens product provided from the lens designing enterprise are restricted.

In the embodiment, the lens design data use management system 220 determines whether or not to permit the processing of the lens based on the accumulated processing number using the lens design data by the lens design data use management device E2 and the information of the first-time processing date (the first-time permission response date) before the lens processing management device E1 performs the processing of the lens using the lens design data. When the lens design data use management device E2 determines that the processing of the lens is permitted, the lens processing management device E1 controls the processing of the lens to be performed. Accordingly, it is possible to appropriately manage the use state of the lens design data, and it is possible to prevent the lens from being processed wrongfully using the lens design data.

According to the embodiment, when the accumulated processing number is not over the maximum processing number in the lens design data use management device E2, the lens design data use management system 220 permits the processing of the lens using the lens design data, and thus it is possible to prevent the lens from being processed wrongfully using the lens design data over the maximum processing number determined by a contract or the like. According to the embodiment, in the lens design data use management system 220, the lens design data use management device E2 calculates the accumulated processing number, and thus it is possible to appropriately manage the accumulated processing number.

In the embodiment, in the lens design data use management system 220, when the reception date of the authentication requirement falls within the period stored in advance from the first response date and time of the authentication permission response, the lens design data use management device E2 permits the processing of the lens using the lens design data, and thus it is possible to prevent the lens from being processed wrongfully using the lens design data over the maximum processing number determined by a contract or the like.

A part of the lens processing device b1 in the embodiment described above, for example, a part of the authentication requirement transmitting section b15, the lens processing control section b16, or the lens designing device c1, for example, the authentication requirement receiving section c15, the authentication processing section 226, the authentication responding section c18, and the accumulated processing number calculating section c19 may be performed by a computer. In that case, a program for realizing the control function may be recorded in a computer-readable recording medium, and the program recorded in the recording medium may be realized by reading and executing the program by a computer system. The "computer system" described herein may include hardware such as an OS and a peripheral device. The "computer-readable recording medium" is a portable medium such as a flexible disk, an optical magnetic disk, a ROM, and CD-ROM, and a storage device such as a hard disk built in a computer system. The "computer-readable recording medium" may include dynamically storing the program for a short time, such as a communication line when the program is transmitted through a network such as the Internet and a communication line such as a telephone line, and storing the program for a predetermined time, such as a volatile memory in a computer system that is a server or a client in that case. The program may be a program for realizing a part of the function described above, and may be a program realized by combination with a program recorded in advance in a computer system described above.

MODIFICATION EXAMPLE

Next, a modification example of the embodiment shown in FIG. 1 and FIG. 2 will be described with reference to FIG. 7.

The description of the same constituent elements as those of the embodiment described above is omitted or simplified.

Figure 7:
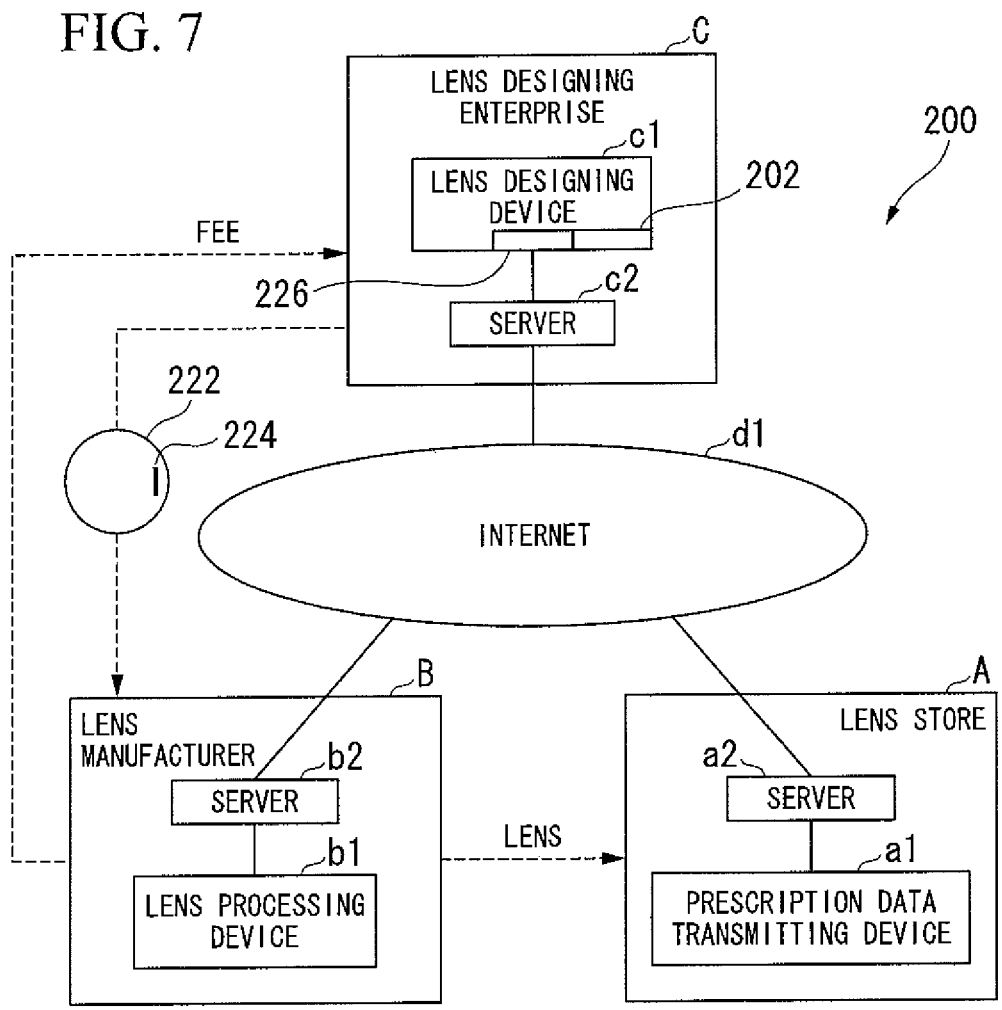
FIG. 7 is a concept diagram illustrating a modification example of the embodiment shown in FIG. 1 or FIG. 2.

In the embodiment, as shown in FIG. 7, the lens processing management system (the lens manufacturing system, and the lens design data use management system) 200 is provided with a processing device (a lens manufacturing device, and a lens processing device) b1 that processes a lens, a designing device (a data supply device) c1 capable of supplying design data to the processing device b1, and a control section 202 (a restriction unit, and a copy restriction unit) that controls a supply flow of the design data from the designing device c1 to the processing device b1.

In the embodiment, the control section 202 is provided in the designing device c1. Alternatively or additionally, the control section 202 may be provided in the processing device b1 or another device. As necessary, the design data is converted into a specific data form for transmission. As necessary, a specific computer program for design data transmission or reception is installed in the designing device c1 and/or the processing device b1. The control section 202 may control the supply flow of the design data according to the progress of the lens processing in the processing device b1. In the control of the control section 202, for example, the minimum design data necessary in a process at any time point is supplied from the designing device c1 to the processing device b1. When the process is completed, the design data used up in the processing device b1 is eliminated or the used-up design data cannot be reused. Subsequently, the minimum design data necessary in the next process is supplied from the designing device c1 to the processing device b1. Alternatively or additionally, a specific computer program for data reception may be supplied from the designing device c1 to the processing device b1 before the transmission and reception of the design data.

In the embodiment, the design data divided into a plurality of parts is gradually supplied from the designing device c1 to the processing device b1. Alternatively, the whole design data is supplied from the designing device c1 to the processing device b1 at once, and may be eliminated after using, or cannot be reused. Alternatively, it is possible to control the used-up design data to be eliminated or so as not to be reused according to the number of using times or the using period.

In the embodiment, the design data transmitted to the processing device b1 is prevented from being copied. That is, the processing of the lens using the used-up design data is restricted.

Next, another modification example of the embodiment shown in FIG. 1 or FIG. 2 will be described with reference to FIG. 8. The description of the same constituent elements as those of the embodiment described above is omitted or simplified.

Figure 8:
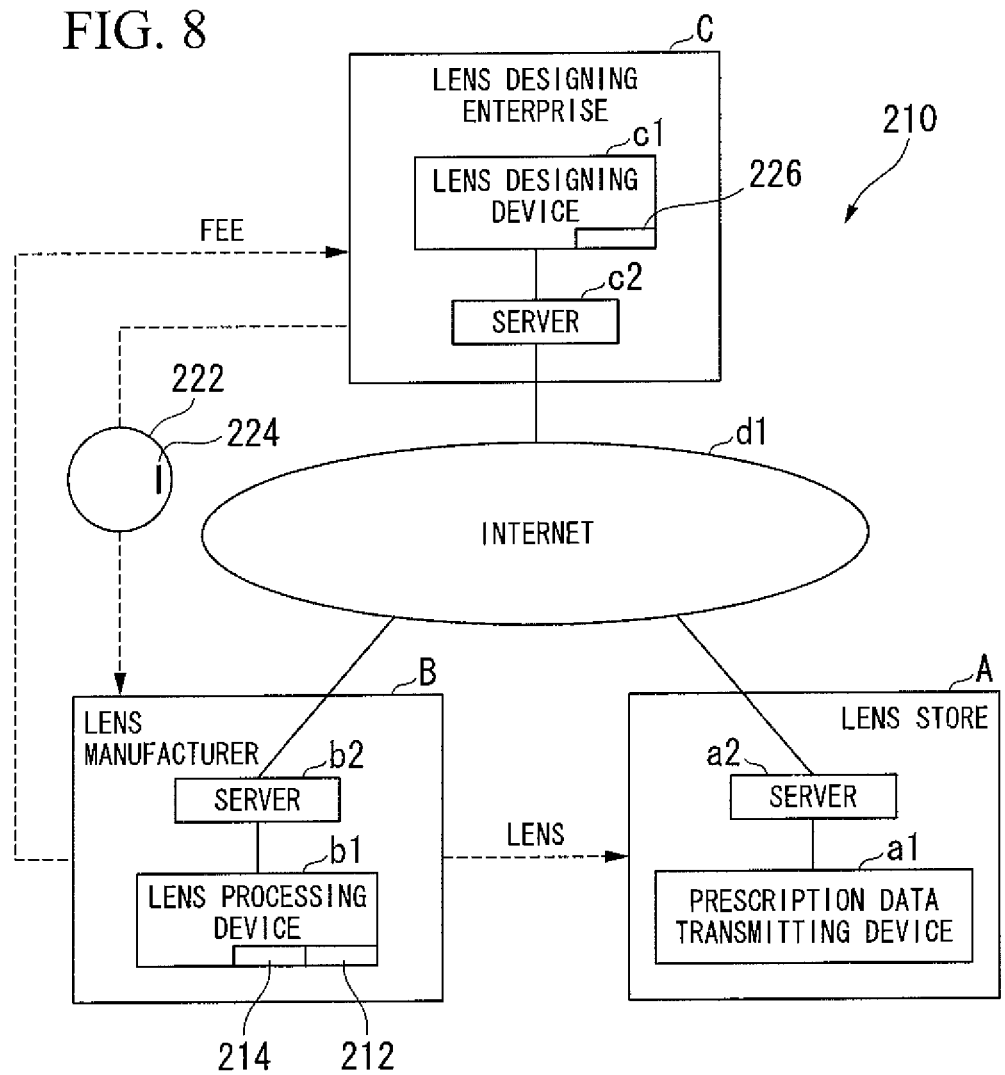
FIG. 8 is a concept diagram illustrating another modification example of the embodiment shown in FIG. 1 or FIG. 2.

In the embodiment, as shown in FIG. 8, the lens processing management system (the lens manufacturing system, and the lens design data use management system) 210 is provided with a processing device b1 that processes a lens, a designing device (a data supply device) c1 capable of supplying design data to the processing device b1, and a recording storing section (a restriction unit, and a recording storing unit) 212 that stores the recording of the operation of the processing device b1.

In the embodiment, the recording storing section 212 is provided in the processing device b1. Alternatively or additionally, the recording storing section 212 may be provided in the designing device c1 or another device. In the embodiment, the recording storing section 212 records the data representing each operation of the processing device b1 according to the progress of the processing process. The number of using times of the design data and the using period can be recognized based on the recording (log) including the recorded data.

In the embodiment, as necessary, a billing processing section (a billing unit) 214 may be provided in the processing device b1 or another device. The billing processing section 214 performs a billing process on the lens manufacturer B based on the recording stored in the recording storing section 212. For example, the billing processing section 214 requires the lens manufacturer B for the payment of the design fee based on the number of using times or the using period of the design data based on the recording, or collects the design fee according to a predetermined procedure.

In the embodiment, the actual use state of the design data is recognized based on the recording (log) of the processing device b1. Accordingly, the processing of the lens wrongfully using the design data is restricted.

Next, still another modification example of the embodiment shown in FIG. 1 and FIG. 2 will be described with reference to FIG. 9. The description of the same constituent elements as those of the embodiment described above is omitted or simplified.

Figure 9:
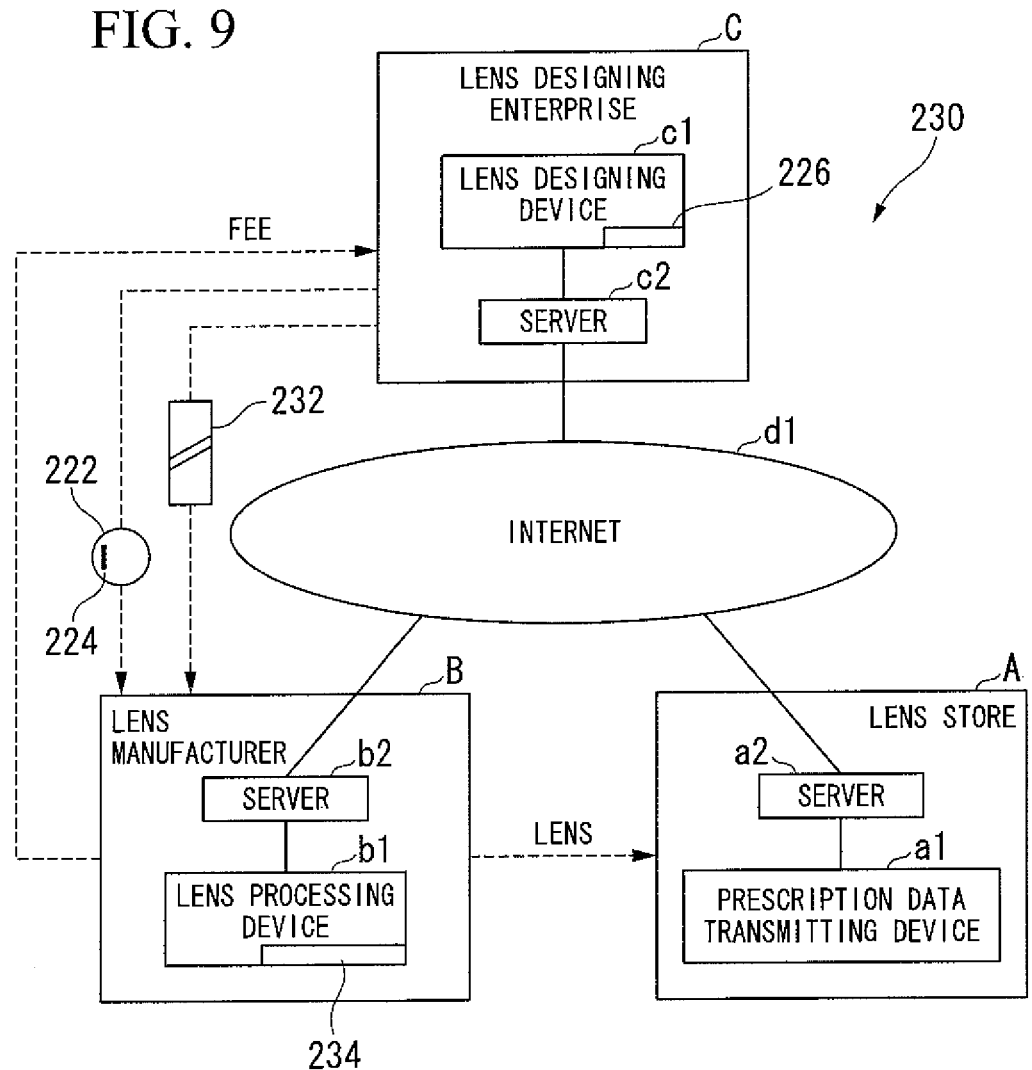
FIG. 9 is a concept diagram illustrating still another modification example of the embodiment shown in FIG. 1 or FIG. 2.

In the embodiment, as shown in FIG. 9, the lens processing management system (the lens manufacturing system, and the lens design data use management system) 230 is provided with a processing device b1 that processes a lens, a designing device (a data supply device) c1 capable of supplying design data to the processing device b1, and a portable medium 232 (a restriction unit, a management unit, and a first medium) for managing the operation of the processing device b1.

In the embodiment, the processing device b1 is provided with a medium insertion device 234 to which the medium 232 is inserted. The insertion of the medium 232 to the medium insertion device 234 enables the lens using the design data to be processed in the processing device b1. The medium 232 includes predetermined data about at least one of the number of using times and the using period of the design data. An aspect of the medium 232 may be various media such as a card (an ID card, a prepaid card, and the like), a USB memory device, and a security token. The medium insertion device 234 can change a state (a status) of the processing device b1 between a restriction state where the lens using the design data is restricted and the non-restriction state. The lens manufacturer B pays the lens design enterprise C for at least the medium 232.

In the embodiment, the processing process of the lens using the design data is performed by the processing device b1, and thus it is possible to rewrite the data of the medium 232 in the medium input device 234. For example, in the initial medium 232, a predetermined number (the number of usable times) is stored. The number stored in the medium 232 is decreased according to the performance of the processing process. In the processing device b1, when the number (the number of usable times) is zero, the processing process using the medium 232 cannot be performed.

In the embodiment, in the lens processing in the processing device b1, the operation management using the medium 232 is performed, and thus the processing of the lens wrongfully using the design data is restricted.

Next, still another modification example of the embodiment shown in FIG. 1 or FIG. 2 will be described with reference to FIG. 10. The description of the same constituent elements as those of the embodiment described above is omitted or simplified.

Figure 10:
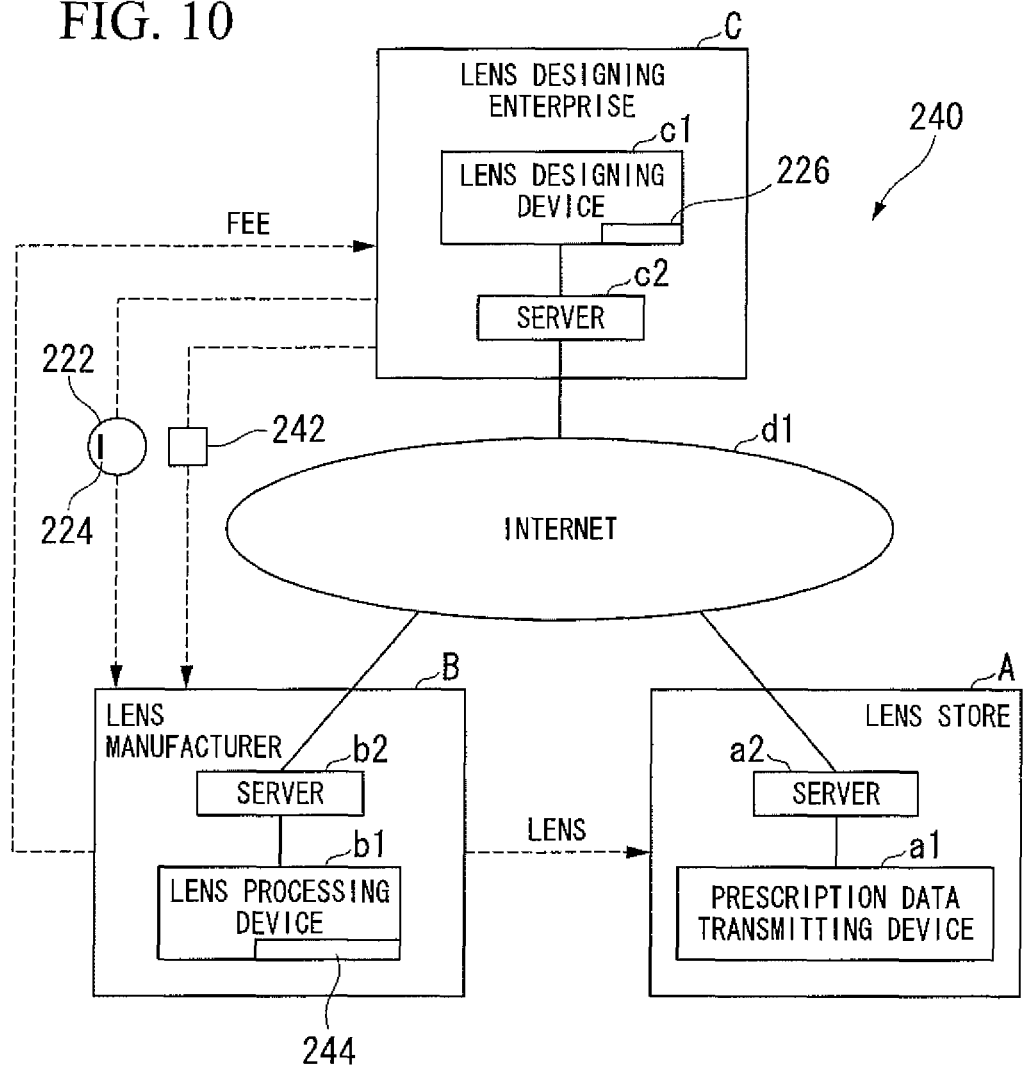
FIG. 10 is a concept diagram illustrating still another modification example of the embodiment shown in FIG. 1 or FIG. 2.

In the embodiment, as shown in FIG. 10, the lens processing management system (the lens manufacturing system, and the lens design data use management system) 240 is provided with a processing device b1 that processes a lens, a design device c1 that generates data (design data, and processing data) of a shape of the lens, and a portable medium (a data supply device) 242 on which design data (processing data) is written.

In the embodiment, the processing device b1 is provided with a reading device 244 that reads the data in the medium 242. The processing device b1 can process the lens using the design data read from the medium 242. An aspect of the medium 242 may be various media such as a memory chip and a CD. The reservation of the data from the medium 242 to another medium is prevented or the medium 242 cannot be copied, and thus copy or wrong using of the design data is restricted. The lens manufacturer B pays the lens designing enterprise C for at least the medium (the design data) 242.

Additionally, the medium 242 may be transported integrally with the semi-finished lens product 222. The lens manufacturer B pays the lens design enterprise C for at least the semi-finished lens product 222 and the medium (the design data) 242.

Additionally, it is possible to use the medium 242 for which the restriction of using the design data only once is performed. The medium 242 may be, for example, an optical memory, or a hologram memory chip. In the example, one design data corresponds to one semi-finished product, and thus the design data is prevented from being used in another semi-finished product.

Next, still another modification example of the embodiment shown in FIG. 1 and FIG. 2 will be described with reference to FIG. 11. The description of the same constituent elements as those of the embodiment described above is omitted or simplified.

Figure 11:
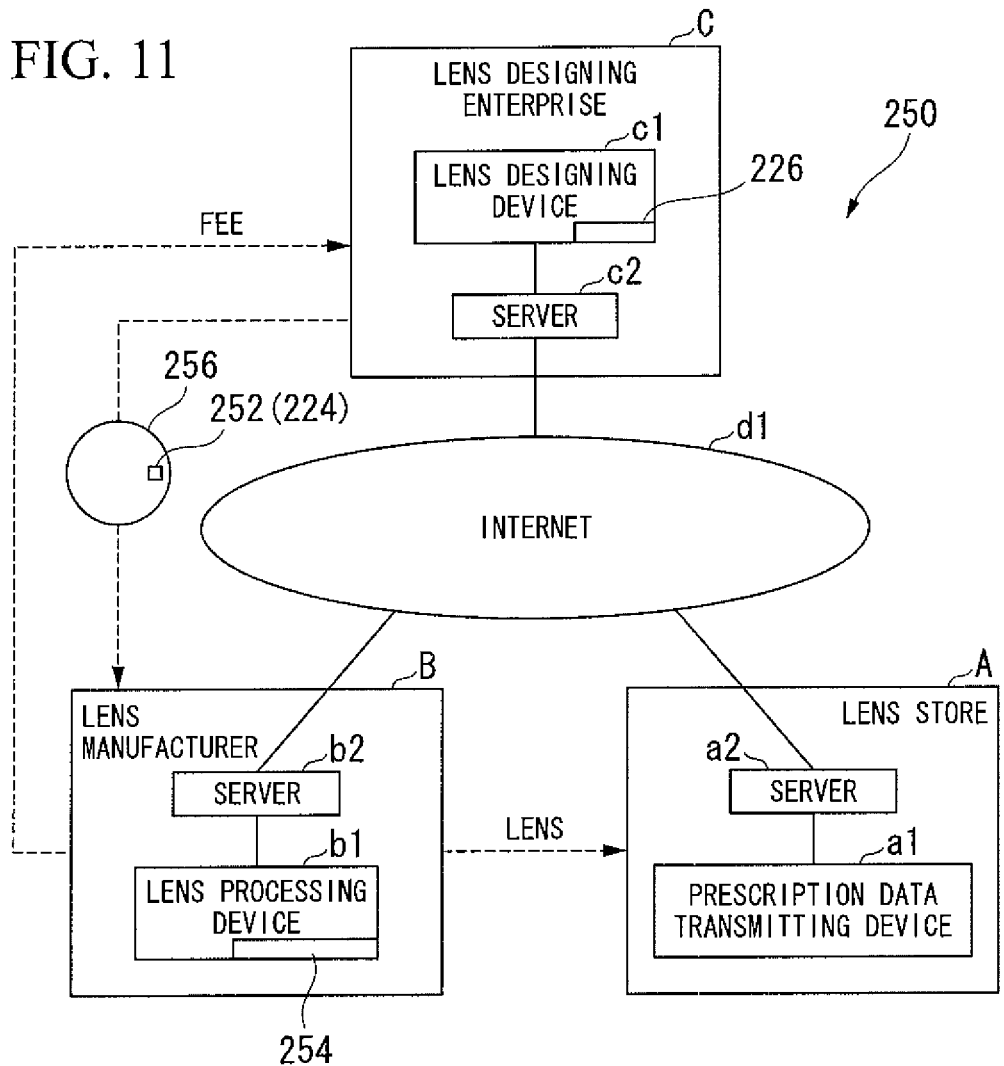
FIG. 11 is a concept diagram illustrating still another modification example of the embodiment shown in FIG. 1 or FIG. 2.

In the embodiment, as shown in FIG. 11, the lens processing management system (the lens manufacturing system, and the lens design data use management system) 250 is provided with a processing device b1 that processes a lens, a design device c1 that generates data (design data, and processing data) of a shape of the lens, and a portable medium (a data supply device) 252 on which design data (processing data) is written. The design data includes authentication information (an authentication section 224, an authentication code, and authentication parameters).

In the embodiment, the processing device b1 is provided with a reading device 254 that reads the data in the medium 242. The processing device b1 can process the lens using the design data read from the medium 252.

In the embodiment, the medium 252 is embedded in the semi-finished lens product 256.

The lens manufacturer B pays the lens design enterprise C for at least the semi-finished lens product 256 and the medium (the design data) 252.

An aspect of the medium 252 may be various media such as a memory chip. The medium 252 including the design data is embedded in the semi-finished lens product 256, and thus one design data corresponds to one semi-finished lend product. As a result, the design data is prevented from being used in another semi-finished lend product. Additionally, it is possible to use the medium 252 for which the restriction of using the design data only once is performed. The medium 252 may be, for example, an optical memory, or a hologram memory chip. In the example, the design data is more reliably prevented from being wrongfully used.

Next, still another modification example of the embodiment shown in FIG. 1 and FIG. 2 will be described with reference to FIG. 12. The description of the same constituent elements as those of the embodiment described above is omitted or simplified.

Figure 12:
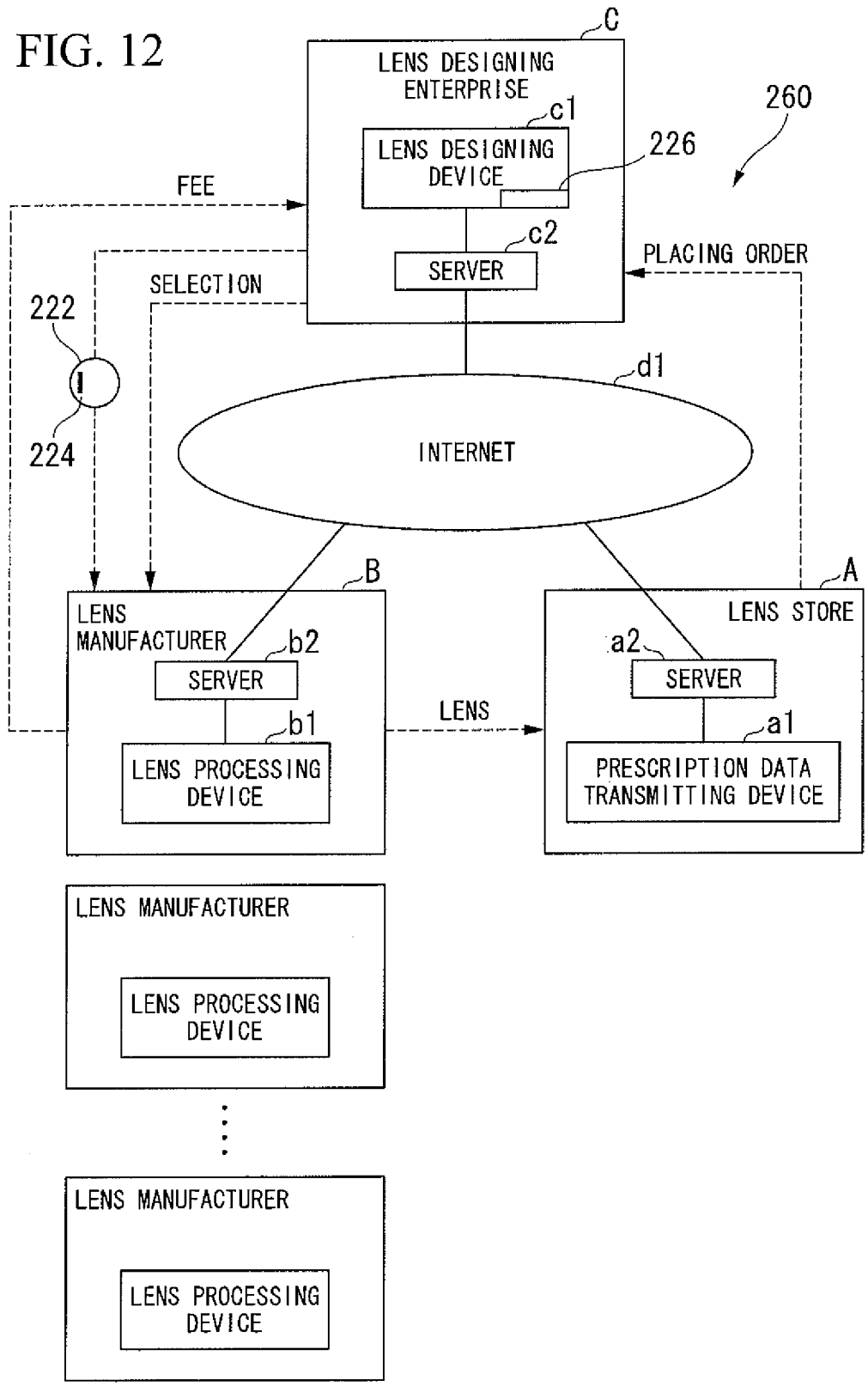
FIG. 12 is a concept diagram illustrating still another modification example of the embodiment shown in FIG. 1 or FIG. 2.

In the embodiment, as shown in FIG. 12, the lens processing management system (the lens manufacturing system, and the lens design data use management system) 260 is provided with a plurality of lens makers having a processing device b1 that processes a lens, a lens designing enterprise C having a design device c1 that generates data (design data, and processing data) of a shape of the lens, and a lens store A that sells lenses.

In the embodiment, an order of a lens is directly placed from the lens store A to the lens design enterprise C. The lens designing enterprise C selects one lens manufacturer B of the plurality of lens makers based on a predetermined procedure in the enterprises. The lens designing enterprise C supplies the design data to the lens manufacturer B. The lens manufacturer B performs the processing of the lens using the design data. The completed lens is supplied from the lens manufacturer B to the lens store A. Alternatively, the completed lens may be supplied from the lens manufacturer B to the lens store A through the lens enterprise C.

In the embodiment, the lens designing enterprise C can collect information about possibility of wrongful using of the lens manufacturer and store the information in a database. For example, it is possible to perform an operation of selecting the lens manufacturer based on the information of the database (a selection unit). By performing the selection of the lens manufacturer by the lens designing enterprise, the design data in the lens manufacturer is prevented from being wrongfully used.

Next, still another modification example of the embodiment shown in FIG. 1 and FIG. 2 will be described with reference to FIG. 13. The description of the same constituent elements as those of the embodiment described above is omitted or simplified.

Figure 13:
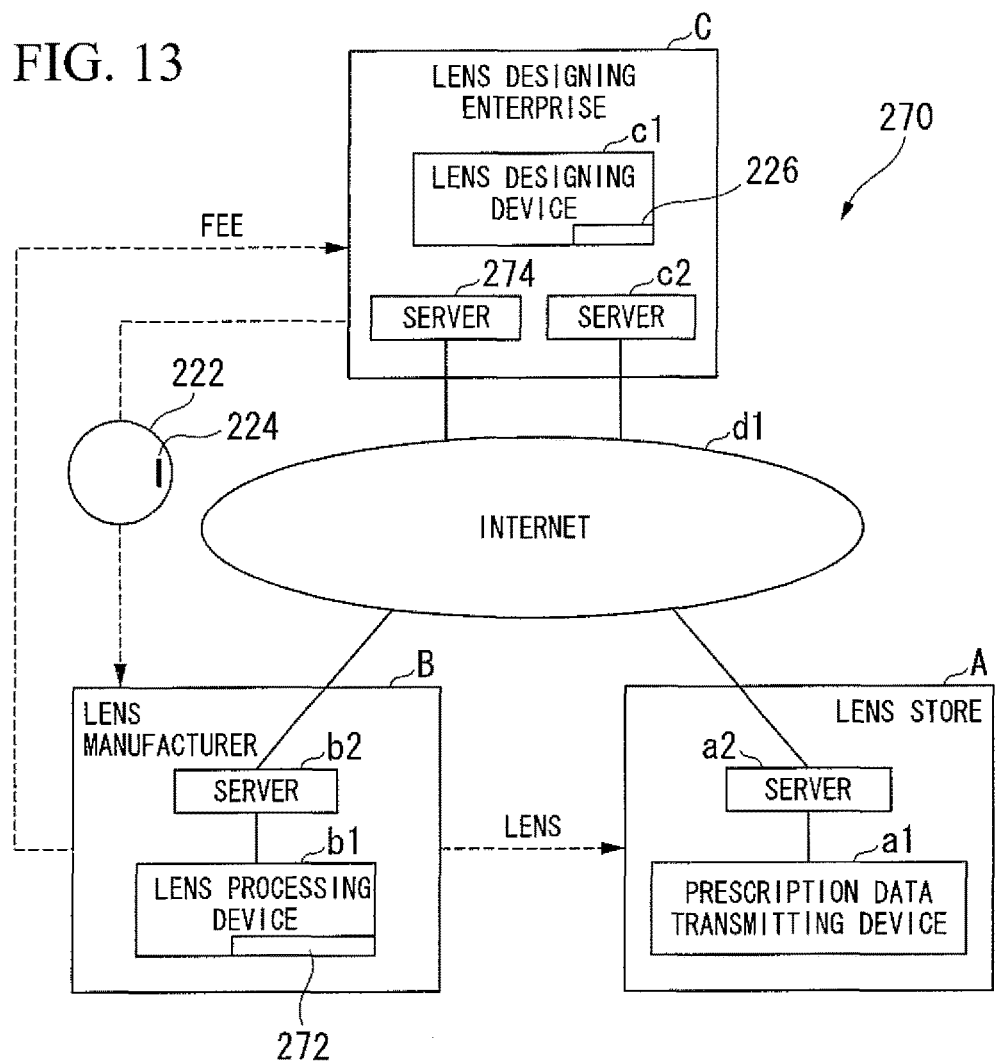
FIG. 13 is a concept diagram illustrating still another modification example of the embodiment shown in FIG. 1 or FIG. 2.

In the embodiment, as shown in FIG. 13, the lens processing management system (the lens manufacturing system, and the lens design data use management system) 270 is provided with a processing device b1 that processes a lens, an optical designing section 272 that generates shape data (design data, and processing data) of the lens about optical design, and a server 274.

In the embodiment, the optical designing section 272 is disposed in the processing device b1. For example, the optical designing section 272 is a predetermined computer program, and is stored in a medium, a device, or a memory. The server 274 stores information about the optical design as necessary. The optical designing section 272 requires the server 274 for permission of the optical design (or the lens processing). The optical designing section 272 receiving the permission may perform the optical design through the server 274 as necessary. The processing device b1 can process the lens using the design data from the optical designing section 272.

In the embodiment, the lens manufacturer B pays the lens designing enterprise C for at least one of at least one of the number of using times (the number of times of the optical design) of the server 274, and the quantity of the lens processing in the processing device b1. Additionally, the operation of the processing device b1 may be managed using the medium (a prepaid card) such as the description using FIG. 10.

In the embodiment, in the lens design or the lens processing, the permission to the server 274 is necessary, and thus the processing of the lens wrongfully using the design data is restricted.

The embodiments of the invention have been described above in detail, but the specific configuration is not limited to the description, and may be variously modified in design within the scope which does not deviate from the main concept of the invention.

In the actual manufacturing, it is possible to correct the lens design data. When a processing error occurs, it is possible to satisfactorily manufacture the lens by correcting the data such as a design value. Since the design data is a complex surface shape, it is generally difficult to cope with the correction in the lens manufacturer.

The amendment (the correction) of the design data may be performed on the design side. In this case, for example, the lens design data may be subjected to the amendment for correcting the processing error occurring at the time of lens processing. The amendment (the correction) of the design data may be performed by the processing device. In this case, for example, the lens processing device may have a configuration of performing the data amendment for correcting the processing error occurring at the time of lens processing. The design data reflecting the error of the semi-finished product may be supplied. In this case, for example, the lens design data may be data including the amendment for correcting an individual curvature gap of each semi-finished product.

For example, the lens designing data may be transmitted through a network after the lens design data is encrypted by an encryption key by the data supply device. The encrypted lens design data may be decoded by a decoding key in the processing device. The encrypted lens design data may be configured to perform the decoding process within a preset period, and may be configured to be automatically eliminated after the preset period is elapsed. The lens design data may be configured to count the number of using times of the decoding key.

The lens design data may be configured to include information whether to use any of a plurality of kinds of semi-materials, in addition to the surface shape for processing a semi-material (a semi-finished product). As necessary, as data for quality confirmation of the processed lens, the lens design data may be configured to include lens shape information such as a center thickness of a lens, an edge thickness, and an outer diameter, and lens frequency information used when performing inspection of lens refractive power using a lens frequency measurement device or the like.

The lens design data may be configured to include the surface shape data of a front face of two faces of the lens, may be configured to include the surface shape data of the back face, and may be configured to include the surface shape data of both front and back faces. The surface shape data may be configured by a point group (a group of spatial coordinates (x coordinates, y coordinates, and z coordinates) in each point of a processing face of a semi-material), may be data formed by performing surface-interpolation on the surface shape data configured by the point group, and may be data formed by converting the surface-interpolated data by an NC processing program.

An order of the lens is directly placed from the lens store to the lens designing enterprise, and the lens designing enterprise may be configured to supply the design data to the lens store. The lens store supplies the design data to the lens manufacturer, and the lens manufacturer may be configured to perform the processing of the lens using the design data. The completed lens is supplied from the lens manufacturer to the lens store.

The kind of the processed lens is not limited, and the embodiment may be applied to a single focus lens, a progressive refractive power lens, a middle progressive lens, a short progressive lens, and the like.

The enterprise receiving the lens shape data representing the shape of the lens by receiving a service of optical design of the lens can wrongfully manufacture a lens repeatedly using the same lens shape data without paying the enterprise performing the optical design, and the enterprise performing the optical design does not easily recognize the wrongness. For this reason, there is a program that the enterprise performing the optical design cannot collect a benefit which can be originally obtained.

In the technology of the related art, it is possible to copy the lens design data, and thus there is a defect that the lens may be wrongfully repeatedly processed, such as two or more lenses are processed, although the lens processing enterprise pays only for design of the processing of one lens. For example, the data displayed and output by the communication device is copied, and thus there is a defect that the lens processing enterprise may manufacture several lenses of the data.

In the technology of the related art, the lens processing enterprise may wrongfully repeatedly process the lenses, and there is a defect that the lens designing enterprise providing the lens design data cannot recognize the wrongness.

In the technology of the related art, there is a defect that it is difficult to appropriately manage the use state of the lens design data, and the lens wrongfully using the lens design data may be processed.

In an embodiment, the lens manufacturing device includes a lens data storing section that stores lens shape data representing a shape of a lens and lens data including the number of usable times, a usage number storing section that stores the number of times where the lens shape data is used, an access control section that reads the number of times where the lens shape data is used from the using number storing section, reads the number of usable times of the lens shape data from the lens data storing section, reads the lens shape data from the lens data storing section when the number of times where the lens shape data is used is smaller than the number of usable times of the lens shape data, and increases the number of times where the lens shape data is used stored in the using number storing section by the using number, a lens shape data memory that stores the lens shape data read by the access control section, and a lens manufacturing section that manufactures a lens based on the lens shape data stored in the lens shape data memory and eliminates the lens shape data from the lens shape data memory after the manufacturing.

In the lens manufacturing device, the following configuration may be employed such that the lens data may further include the usable period of the lens shape data, the access control section reads the usable period of the lens shape data from the lens data storing section, and the lens shape data is read from the lens data storing section when the usable period is not elapsed and when the number of times where the lens shape data is used is smaller than the number of usable times of the lens shape data.

In another embodiment, the lens design data use management system includes a lens processing management device that manages the processing of the lens using the lens design data, and a lens design data use management device that communicates with the lens processing management device. In the system, the lens processing management device includes a processing or non-processing confirmation requirement transmitting section that transmits processing or non-processing confirmation requirement for confirming whether or not to process the lens to the lens design data use management device before performing the processing of the lens using the lens design data, and a lens processing control section that performs a control of performing the processing of the lens when the processing permission response representing that the processing of the lens is performed is received as the response of the processing or non-processing confirmation requirement transmitted by the processing or non-processing confirmation transmitting section, and the lens design data use management device includes a processing or non-processing determining section that determines whether or not to permit the processing of the lens based on the information about the use state of the lens design data with respect to the processing or non-processing confirmation requirement transmitted from the processing or non-processing confirmation requirement transmitting section, and a processing or non-processing responding section that transmits the processing permission response to the lens processing management device when the processing or non-processing determining section permits the processing of the lens.

According to the configuration, the lens design data use management system determines whether or not to permit the processing of the lens based on the information about the use state of the lens design data before the lens design data use management device performs the processing of the lens using the lens design data, the lens processing management device performs the control of performing the processing of the lens when the lens processing management device determines that the processing of the lens is permitted, it is possible to appropriately manage the use state of the lens design data, and it is possible to prevent the lens from being processed wrongfully using the lens design data.

In the lens design data use management system, the information about the use state of the lens design data is the accumulated processing number of performing the processing using the lens design data by the control of the lens processing management device for each lens design data, and the processing or non-processing determining section may permit the processing of the lens using the lens design data when the accumulated processing number is not over the maximum processing number stored in advance.

According to the configuration, in the lens design data use management system, the lens design data use management device permits the processing of the lens using the lens design data when the accumulated processing number is not over the maximum processing number, and thus it is possible to prevent the lens from being processed wrongfully using the lens design data over the maximum processing number determined by a contract or the like.

In the lens design data use management system, the lens design data use management device is provided with an accumulated processing number calculating section that calculates the accumulated processing number of the number of processing when the permission is performed by the processing permission response, and the processing or non-processing determining section may permit the processing of the lens using the lens design data when the accumulated processing number calculated by the accumulating processing number calculating section is not over the maximum processing number stored in advance.

According to the configuration, in the lens design data use management system, the lens design data use management device calculates the accumulated processing number, and thus it is possible to appropriately manage the accumulated processing number.

In the lens design data use management system, the maximum processing number may be equal to or less than 20 times.

In the lens design data use management system, the information about the use state of the lens design data is the first response date and time of the processing permission response, the processing or non-processing responding section stores the first response date and time of the processing permission response in the first-time permission response date and time storing section, and the processing or non-processing determining section may permit the processing of the lens using the lens design data when the reception date and time of the processing or non-processing confirmation requirement reception date and time fall within the period stored in advance from the first response date and time of the processing permission response stored in the first-time permission response date and time storing section.

According to the configuration, in the lens design data use management system, the lens design data use management device permits the processing of the lens using the lens design data when the reception date and time of the processing or non-processing confirmation requirement reception date and time fall within the period stored in advance from the first response date and time of the processing permission response, and thus it is possible to prevent the lens from being processed wrongfully using the lens design data over the maximum processing number determined by a contract or the like.

In the lens design data use management system, the period stored in advance is within 20 days.

In the several embodiments according to the invention, it is possible to suppress that the enterprise receiving the lens shape data wrongfully manufactures the lens with respect to the enterprise of the optical design source. More specifically, according to the invention, it is possible to make the lens processing using the lens shape data over the number of usable times not to be performed.

In the several embodiments according to the invention, the lens design data use management system, the lens design data use management device determines whether or not to permit the processing of the lens based on the information about the use state of the lens design data before the lens processing management device performs, the processing of the lens using the lens design data, and the lens processing management device performs the control of performing the processing of the lens when the lens design data use management device determines that the processing of the lens is permitted, it is possible to appropriately manage the use state of the lens design data, and it is possible to prevent the lens from being processed wrongfully using the lens design data.

The invention claimed is:

1. A lens processing management system comprising:
a lens processing section that processes a lens;
an authentication section that includes an authentication code of design data of the lens and is substantially attached to a lens material or a semi-finished lens product;
a data supply portion that supplies the design data, which is associated with the authentication section attached to the lens material or the semi-finished lens product, to the lens processing section; and
an authentication processing section that performs an authentication process for the processing of the lens material or the semi-finished lens product based on a comparison result whether or not an authentication code which is indicated by the authentication section attached to the lens material or the semi-finished lens product and identification information indicating the supplied design data are in advance associated with each other.

2. The lens processing management system according to claim 1, wherein the authentication processing section performs an authentication process for use permission of the design data.

3. The lens processing management system according to claim 1, wherein the authentication processing section performs the authentication process through a network or substantially without a network.

4. The lens processing management system according to claim 1, wherein the authentication section is provided in the lens material or the semi-finished lens product.

5. The lens processing management system according to claim 1, wherein the authentication section is shipped with the lens material or the semi-finished lens product.

6. The lens processing management system according to claim 1, wherein the authentication section includes a substantially visible authentication code.

7. The lens processing management system according to claim 1, wherein the authentication section includes an authentication code which is invisible and is detected through a predetermined apparatus.

8. The lens processing management system according to claim 1, wherein the authentication section includes one authentication code corresponding to one semi-finished lens product.

9. The lens processing management system according to claim 1, wherein the authentication section includes one authentication code corresponding to a plurality of semi-finished lens products.

10. The lens processing management system according to claim 1, wherein the authentication processing section performs the authentication process using identification information for the lens processing section in addition to authentication information of the authentication section.

11. A lens processing management system comprising:
a processing device that processes a lens;
a data supply device that supplies design data to the processing device; and
a restriction unit that restricts processing of the lens using the design data in the processing device,
wherein the restriction unit includes an authentication unit including information used in authentication of use permission of the design data, the authentication unit being supplied to the processing device with a semi-finished product of the lens or being embedded in the semi-finished product of the lens.

12. The lens processing management system according to claim 11, wherein the restriction unit restricts processing of the lens through a network or substantially without a network.

13. The lens processing management system according to claim 11, wherein the restriction unit restricts processing of the lens based on the number of times where the design data is used.

14. The lens processing management system according to claim 11, wherein the restriction unit restricts processing of the lens based on a period where the design data is used.

15. The lens processing management system according to claim 11, wherein the restriction unit includes a copy restriction unit that restricts copy of the design data.

16. The lens processing management system according to claim 15, wherein the copy restriction unit restricts saving of the design data to locations other than a predetermined location.

17. The lens processing management system according to claim 15, wherein the copy restriction unit controls supply of the design data from the data supply device to the processing device.

18. The lens processing management system according to claim 11, wherein the restriction unit includes a switching unit that switches the processing device at least between a restriction state and a non-restriction state, and a management unit that manages at least one of the number of times and the period where the design data is used in the processing device.

19. The lens processing management system according to claim 18, wherein the management unit includes a first medium which is portable and in which predetermined data about at least one of the number of using times and the using period is stored.

20. The lens processing management system according to claim 11, wherein the restriction unit includes a recording storing unit that is disposed substantially in the processing device and stores recording of an operation of the processing device, and a billing unit that performs a billing process based on the recording stored in the recording storing unit.

21. The lens processing management system according to claim 11, wherein the data supply device includes a design section that is disposed substantially in the processing device and designs at least a part of the lens, and
wherein the restriction unit includes a server that is required for permission of design from the design section.

22. The lens processing management system according to claim 11, wherein the data supply device includes a second medium which is portable and in which the design data is stored.

23. The lens processing management system according to claim 22, wherein the number of times where the design data is extracted in the second medium is restricted.

24. The lens processing management system according to claim 22, wherein the second medium is supplied to the processing device with the semi-finished product of the lens or is embedded in the semi-finished product of the lens.

25. The lens processing management system according to claim 11, wherein the restriction unit includes a selection unit that selects the processing device.

26. The lens processing management system according to claim 11, wherein the design data is supplied to the processing device in an encrypted state.

27. A lens manufacturing system comprising:
a processing section that processes a lens using design data supplied from a data supply device; and
a restriction unit that restricts the processing of the lens using the design data in the processing section,
wherein the restriction unit includes an authentication unit including information used in authentication of use permission of the design data, the authentication unit being supplied to the processing device with a semi-finished product of the lens or being embedded in the semi-finished product of the lens.

28. A non-transitory computer readable medium comprising instructions for executing:
a step of permitting use of design data associated with a lens material or a semi-finished lens product based on a comparison result whether or not information indicated by an authentication code supplied to a processing device with the lens material or the semi-finished lens product or embedded in the lens material or the semi-finished lens product and identification information indicating the design data associated with the lens material or the semi-finished lens product are in advance associated with each other; and
a step of processing the lens material or the semi-finished lens product using the design data associated with the lens material or the semi-finished lens product.

29. A lens processing management method comprising:
permitting use of design data associated with a lens material or a semi-finished lens product based on a comparison result whether or not an authentication code supplied to a processing device with the lens material or the semi-finished lens product or embedded in the lens material or the semi-finished lens product and identification information indicating the design data associated with the lens material or the semi-finished lens product are in advance associated with each other; and performing lens processing in the processing device using the design data associated with the lens material or the semi-finished lens product.

30. A data supply device which supplies design data to a processing device processing a lens, comprising:
    an input unit that embeds a restriction unit into the design data, the restriction unit including an authentication code including information used in authentication of use permission of the design data, the authentication code being supplied to the processing device with a lens material or a semi-finished lens product or being embedded in lens material or the semi-finished lens product and restricting processing of the lens material or the semi-finished lens product using the design data in the processing device based on a comparison result whether or not information indicated by the authentication code supplied to a processing device with the lens material or the semi-finished lens product or embedded in the lens material or the semi-finished lens product and identification information indicating the design data are in advance associated with each other.

31. A lens design data use management system comprising:
    a lens processing management device that manages processing of a lens using lens design data; and
    a lens design data use management device that communicates with the lens processing management device,
    wherein the lens processing management device includes:
        an authentication requirement transmitting section that transmits an authentication requirement based on information of an authentication section substantially attached to a lens material or a semi-finished lens product to the lens design data use management device before the processing of the lens is performed using the lens design data, and
        a design data control section that enables the lens design data to be used when an authentication permission response representing permission of the processing of the lens is received as a response to the authentication requirement transmitted by the authentication requirement transmitting section, and
    wherein the lens design data use management device includes:
        an authentication processing section that determines whether or not to permit the processing of the lens based on information about a use state of the lens design data with respect to the authentication requirement transmitted from the authentication requirement transmitting section, and
        an authentication responding section that transmits the authentication permission response to the lens processing management device when the authentication processing section permits the processing of the lens.

32. The lens design data use management system according to claim 31, wherein the information about the use state of the lens design data is the accumulated number of times where the processing is performed using the lens design data according to a control of the lens processing management device on each of the lens design data, and
    wherein the authentication processing section permits the processing of the lens using the lens design data when the accumulated number of processing times does not exceed the maximum number of processing times stored in advance.

33. A lens design data use management device which communicates with a lens processing management device which processes based on a lens design data corresponding to an authentication code attached to a lens material or a semi-finished lens product which is a processing target, comprising:
    an authentication processing section that determines whether or not to permit processing of the lens material or the semi-finished lens product where the authentication code is attached, by comparing whether or not the authentication code attached to the lens material or the semi-finished lens product transmitted from the lens processing management device and identification information indicating the lens design data are in advance associated with each other, with respect to an authentication requirement transmitted from the lens processing management device; and
    a processing or non-processing responding section that transmits an authentication response representing permission of the processing of the lens material or the semi-finished lens product where the authentication code is attached, to the lens processing management device when the authentication processing section determines that the processing of the lens material or the semi-finished lens product where the authentication code is attached is permitted.

34. A lens design data use non-transitory computer readable medium comprising instructions for causing a computer of a lens design data use management device which communicates with a lens processing management device, which processes based on a lens design data corresponding to an authentication code attached to a lens material or a semi-finished lens product which is a processing target, to function as:
    an authentication processing unit that determines whether or not to permit processing of the lens material or the semi-finished lens product where the authentication code is attached, by comparing whether or not the authentication code attached to the lens material or the semi-finished lens product, which is a processing target, transmitted from the lens processing management device and identification information indicating the lens design data are in advance associated with each other, with respect to an authentication requirement for confirming whether processing or non-processing of the lens material or the semi-finished lens product where the authentication code is attached, transmitted from the lens processing management device is performed; and
    an authentication responding unit that transmits an authentication permission response representing permission of the processing of the lens material or the semi-finished lens product where the authentication code is attached, to the lens processing management device when the authentication processing unit permits the processing of the lens material or the semi-finished lens product where the authentication code is attached.

35. A lens manufacturing method comprising:
    permitting use of design data associated with a lens material or a semi-finished lens product based on a comparison result whether or not an authentication code supplied to a processing device with the lens material or the semi-finished lens product or embedded in the lens material or the semi-finished lens product and identification information indicating the design data associated with the lens material or the semi-finished lens product are in advance associated with each other; and processing the lens material or the semi-finished lens product using the design data associated with the lens material or the semi-finished lens product which is a processing target.

\* \* \* \* \*